United States Patent
Toda et al.

(10) Patent No.: US 11,130,492 B2
(45) Date of Patent: Sep. 28, 2021

(54) VEHICLE CONTROL DEVICE, VEHICLE CONTROL METHOD, AND STORAGE MEDIUM

(71) Applicant: HONDA MOTOR CO., LTD., Tokyo (JP)

(72) Inventors: Akihiro Toda, Wako (JP); Yugo Ueda, Wako (JP); Dan Umeda, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 273 days.

(21) Appl. No.: 16/292,459

(22) Filed: Mar. 5, 2019

(65) Prior Publication Data
US 2019/0276028 A1  Sep. 12, 2019

(30) Foreign Application Priority Data
Mar. 7, 2018 (JP) .............................. JP2018-041267

(51) Int. Cl.
| | |
|---|---|
| B60W 30/10 | (2006.01) |
| B60W 30/12 | (2020.01) |
| B60W 30/16 | (2020.01) |
| B60W 30/18 | (2012.01) |
| B60W 40/00 | (2006.01) |
| B60W 40/02 | (2006.01) |
| B60W 40/04 | (2006.01) |

(Continued)

(52) U.S. Cl.
CPC ...... B60W 30/18163 (2013.01); B60W 30/12 (2013.01); B60W 40/04 (2013.01)

(58) Field of Classification Search
CPC ........... B60W 30/18163; B60W 40/04; B60W 30/12; B60W 60/00272; B60W 2554/804; B60W 2554/801; B60W 50/0097; B60W 30/10; B60W 30/16; B60W 30/18; B60W 40/02; B60W 40/00

USPC .......................................................... 701/27
See application file for complete search history.

(56) References Cited

U.S. PATENT DOCUMENTS

| 10,486,708 B1* | 11/2019 | Chan ................... G06K 9/00825 |
| 2015/0344034 A1* | 12/2015 | Niino .................... B60W 30/16 701/96 |
| 2016/0280236 A1* | 9/2016 | Otsuka ................ B60W 50/082 |

(Continued)

FOREIGN PATENT DOCUMENTS

| JP | 2000207577 A | * | 7/2000 |
| JP | 2005-025528 | | 1/2005 |

*Primary Examiner* — Abby Y Lin
*Assistant Examiner* — Hossam M Abd El Latif
(74) *Attorney, Agent, or Firm* — Amin, Turocy & Watson, LLP

(57) ABSTRACT

A vehicle control device includes a recognizer which recognizes objects around a host vehicle, a determiner which determines whether a speed of a preceding vehicle present ahead of the host vehicle in a host lane in which the host vehicle is present among one or more objects recognized by the recognizer is less than a predetermined speed and determines whether predetermined conditions with respect to conditions ahead of the preceding vehicle are satisfied when it is determined that the speed of the preceding vehicle is less than the predetermined speed, and a driving controller which causes the host vehicle to overtake at least the preceding vehicle by controlling the speed and steering of the host vehicle when the determiner determines that the predetermined conditions are satisfied.

14 Claims, 17 Drawing Sheets

(51) Int. Cl.
*B60W 50/00* (2006.01)
*B60W 60/00* (2020.01)

(56) References Cited

U.S. PATENT DOCUMENTS

2017/0106861 A1* 4/2017 Oh .................. B60W 30/143
2020/0231151 A1* 7/2020 Aoki ................ B60W 30/165

* cited by examiner

FIG. 16

| SECTION | PRESENCE OR ABSENCE OF FACILITY | OVERTAKE FREQUENCY PER TIME ZONE | | | | | | | |
|---|---|---|---|---|---|---|---|---|---|
| | | 00:00~03:00 | 04:00~07:00 | 07:00~10:00 | 10:00~13:00 | 13:00~16:00 | 16:00~19:00 | 19:00~21:00 | 21:00~24:00 |
| A | PRESENT | LOW | LOW | LOW | HIGH | LOW | HIGH | HIGH | LOW |
| B | ABSENT | LOW | LOW | HIGH | LOW | LOW | HIGH | HIGH | LOW |
| C | PRESENT | LOW | LOW | LOW | HIGH | HIGH | LOW | HIGH | HIGH |
| ... | ... | ... | ... | ... | ... | ... | ... | ... | ... |

182

VEHICLE CONTROL DEVICE, VEHICLE CONTROL METHOD, AND STORAGE MEDIUM

CROSS-REFERENCE TO RELATED APPLICATION

Priority is claimed on Japanese Patent Application No. 2018-041267, filed Mar. 7, 2018, the content of which is incorporated herein by reference.

BACKGROUND

Field of the Invention

The present invention relates to a vehicle control device, a vehicle control method, and a storage medium.

Description of Related Art

Recently, research on automatic control of vehicle driving (hereinafter referred to as automated driving) has been carried out. On the other hand, a technique of determining the traffic conditions from presence or absence of vehicles and vehicle speeds, determining whether stopped vehicles are caused by traffic congestion or parking on roads and providing the determination results to a user is known (for example, Japanese Unexamined Patent Application, First Publication No. 2005-25528).

SUMMARY

With respect to conventional techniques, there are cases in which it is not possible to identify whether a stopped vehicle is a vehicle parked on a road, a vehicle stopped due to traffic congestion caused by traffic signals or a vehicle stopped due to traffic congestion during entering a parking lot of a store. When automated driving of a vehicle is performed in such a situation, it is conceivable that it may not be possible to appropriately determine whether to overtake a stopped vehicle.

An object of an aspect of the present invention devised in view of the aforementioned circumstances is to provide a vehicle control device, a vehicle control method and a storage medium by which it is possible to overtake a preceding vehicle more appropriately in response to surrounding traffic conditions.

A vehicle control device, a vehicle control method and a storage medium according to the present invention employed the following configurations.

(1): A vehicle control device according to one aspect of the present invention includes: a recognizer which recognizes objects around a host vehicle; a determiner which determines whether a speed of a preceding vehicle present ahead of the host vehicle in a host lane in which the host vehicle is present among one or more objects recognized by the recognizer is less than a predetermined speed and determines whether predetermined conditions with respect to conditions ahead of the preceding vehicle are satisfied when it is determined that the speed of the preceding vehicle is less than the predetermined speed; and a driving controller which causes the host vehicle to overtake at least the preceding vehicle by controlling the speed and steering of the host vehicle when the determiner determines that the predetermined conditions are satisfied.

(2): In the aspect of (1), the predetermined conditions include a condition that one or more other vehicles are not present further ahead of the preceding vehicle with a speed less than the predetermined speed.

(3): In the aspect of (1), the predetermined condition includes a condition that a predetermined facility is present ahead along the host lane when viewed from the host vehicle, a condition that the speed of a vehicle group including the preceding vehicle present in the host lane and a plurality of other vehicles present ahead of the preceding vehicle in the host lane is less than a predetermined speed, and a condition that the vehicle group includes a vehicle operating a turn indicator on the side at which the predetermined facility is present.

(4): In the aspect of (1), the predetermined conditions include a condition that a predetermined facility is present ahead when viewed from the host vehicle, a condition that a dedicated lane for entering the predetermined facility from the host lane is present, and a condition that the speed of a vehicle group including the preceding vehicle present in the host lane and a plurality of other vehicles present ahead of the preceding vehicle and extending to the dedicated lane is less than a predetermined speed.

(5): In the aspect of (3), the predetermined conditions include a condition that an inclination of a first vehicle of the vehicle group with respect to the vehicle width direction is equal to or greater than a threshold value.

(6): In the aspect of (5), the driving controller controls the speed and steering of the host vehicle to cause the host vehicle to move to a position biased to a side at which the predetermined facility is present from the center of the host lane in the vehicle width direction when the determiner determines that the speed of the preceding vehicle is less than the predetermined speed, and the determiner determines whether the predetermined conditions are satisfied on the basis of the inclination of the first vehicle of the vehicle group in the vehicle width direction recognized by the recognizer at the position biased from the center of the host lane.

(7): In the aspect of (3), the predetermined conditions include a condition that the position of a first vehicle of the vehicle group is nearer to the host vehicle than the position of the predetermined facility in the traveling direction of the vehicle.

(8): In the aspect of (7), the driving controller controls the speed and steering of the host vehicle to cause the host vehicle to move to a position biased to a side at which the predetermined facility is not present from the center of the host lane in the vehicle width direction when the determiner determines that the speed of the preceding vehicle is less than the predetermined speed, and the determiner determines whether the predetermined conditions are satisfied by comparing the position of the first vehicle of the vehicle group recognized by the recognizer at the position biased from the center of the host lane with the position of the predetermined facility.

(9): In the aspect of (3), the predetermined conditions include a condition that an intersection present ahead of the preceding vehicle when viewed from the host vehicle and the first vehicle of the vehicle group are separated from each other by a predetermined distance or more in the traveling direction of the vehicle.

(10): In the aspect of (3), the predetermined conditions include a condition that an intersection present ahead of the preceding vehicle when viewed from the host vehicle and the predetermined facility are separated from each other by a predetermined distance or more in the traveling direction of the vehicle.

(11): In the aspect of (3), the predetermined conditions include a condition that a difference between a distance between the position of the preceding vehicle and the position of the predetermined facility on a map including a route to a destination of the host vehicle and the length of the vehicle group is within a predetermined range.

(12): In the aspect of (3), the predetermined conditions include a condition that an intersection present ahead of the preceding vehicle when viewed from the host vehicle is farther away from the host vehicle than the position of the predetermined facility in the traveling direction of the vehicle.

(13): In the aspect of (3), the predetermined conditions include a condition that the vehicle group is present at a position biased from the center of the host lane to the side of a road side strip.

(14): In the aspect of (3), the vehicle control device further includes an acquisitor which acquires facility information about the predetermined facility, wherein the determiner further determines whether the predetermined conditions are satisfied on the basis of the facility information acquired by the acquisitor.

(15): In the aspect of (3), the determiner determines whether the predetermined conditions are satisfied on the basis of a history of overtaking performed by vehicles that have traveled in the host lane in the past when it is determined that the speed of the preceding vehicle is less than the predetermined speed.

(16): Another aspect of the present invention is a vehicle control method by which an in-vehicle computer recognizes objects around a host vehicle; determines whether a speed of a preceding vehicle present ahead of the host vehicle in a host lane in which the host vehicle is present among one or more objects recognized by a recognizer is less than a predetermined speed and determines whether predetermined conditions with respect to conditions ahead of the preceding vehicle are satisfied when it is determined that the speed of the preceding vehicle is less than the predetermined speed; and causes the host vehicle to overtake at least the preceding vehicle by controlling the speed and steering of the host vehicle when a determiner determines that the predetermined conditions are satisfied.

(17): Another aspect of the present invention is a computer readable non-transitory storage medium storing a program for causing an in-vehicle computer to execute: a process of recognizing objects around a host vehicle; a process of determining whether a speed of a preceding vehicle present ahead of the host vehicle in a host lane in which the host vehicle is present among one or more objects recognized by a recognizer is less than a predetermined speed; a process of determining whether predetermined conditions with respect to conditions ahead of the preceding vehicle are satisfied when it is determined that the speed of the preceding vehicle is less than the predetermined speed; and a process of causing the host vehicle to overtake at least the preceding vehicle by controlling the speed and steering of the host vehicle when a determiner determines that the predetermined conditions are satisfied.

According to the above-described aspects of (1) to (17), it is possible to overtake a preceding vehicle more appropriately in response to surrounding traffic conditions.

BRIEF DESCRIPTION OF THE DRAWINGS

FIG. 16 is a diagram showing an example of traveling history information.

DESCRIPTION OF EMBODIMENTS

Hereinafter, embodiments of a vehicle control device, a vehicle control method and a storage medium of the present invention will be described with reference to the drawings. Although cases in which the law of left-handed traffic is applied will be described hereinafter, the left and right sides may be changed when the law of right-handed traffic is applied.

First Embodiment

[Overall Configuration]

Figure 1:
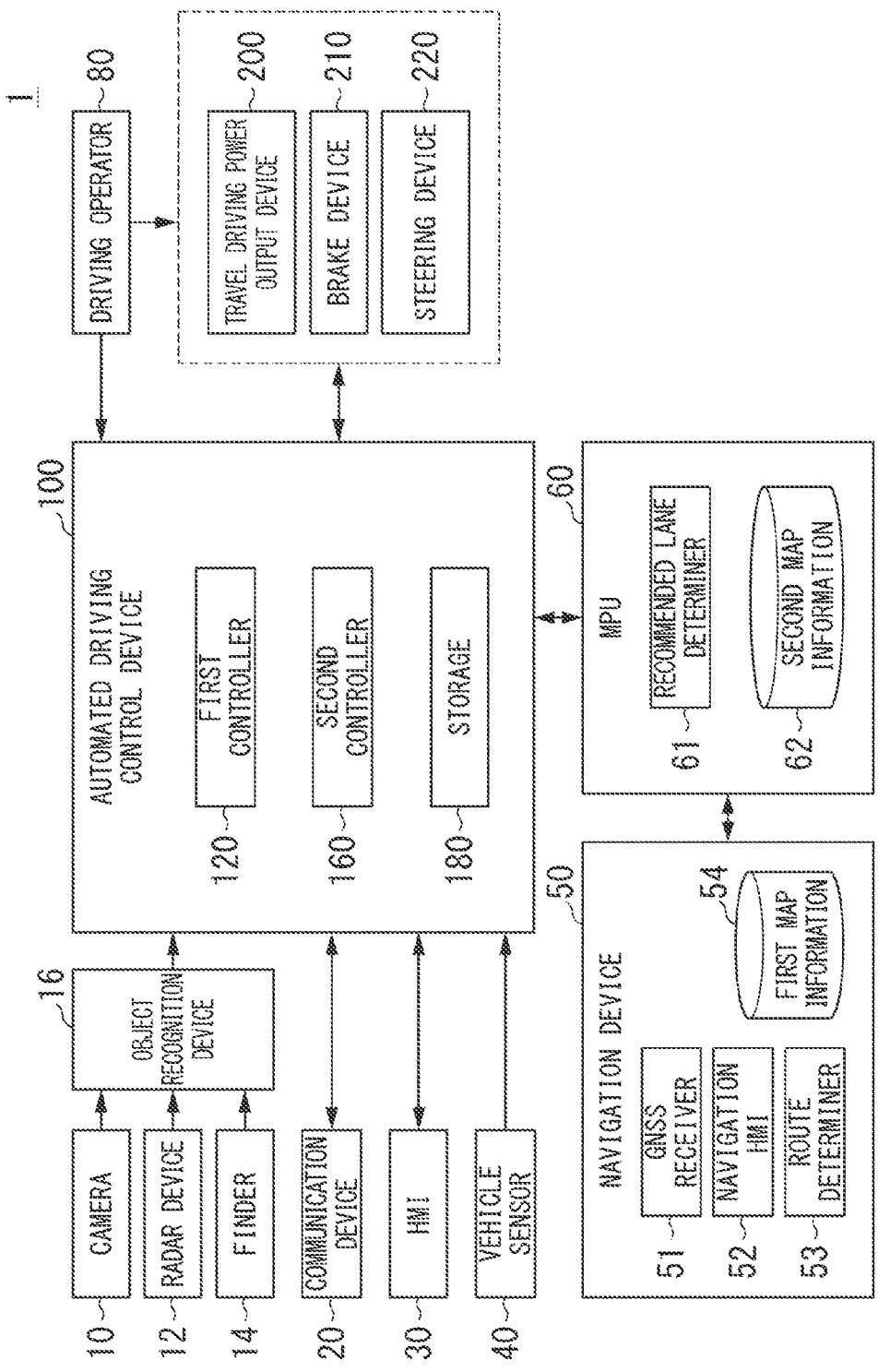
FIG. 1 is a block diagram of a vehicle system using a vehicle control device according to a first embodiment.

FIG. 1 is a block diagram of a vehicle system 1 using a vehicle control device according to a first embodiment. For example, a vehicle (hereinafter referred to as a host vehicle M) equipped with the vehicle system 1 is a two-wheeled, three-wheeled, four-wheeled vehicle or the like and a driving source thereof includes an internal combustion engine such as a diesel engine or a gasoline engine, a motor or a combination thereof. The motor operates using power generated by a generator connected to the internal combustion engine or power discharged from a secondary battery or a fuel battery.

For example, the vehicle system 1 includes a camera 10, a radar device 12, a finder 14, an object recognition device 16, a communication device 20, a human machine interface (HMI) 30, a vehicle sensor 40, a navigation device 50, a map positioning unit (MPU) 60, a driving operator 80, an automated driving control device 100, a travel driving power output device 200, a brake device 210, and a steering device 220. These devices and apparatuses are connected through a multiplex communication line and a serial communication line such as a controller area network (CAN) communication line, a wireless communication network, and the like. The configuration shown in FIG. 1 is merely an example and a part of the configuration may be omitted or other configurations may be further added.

For example, the camera 10 is a digital camera using a solid state imaging device such as a charge coupled device (CCD) or a complementary metal oxide semiconductor (CMOS). The camera 10 is attached to any portion of the host vehicle M. When a front view image is captured, the camera 10 is attached to the upper part of the front windshield, the rear side of a rear view mirror, or the like. For example, the camera 10 periodically repeatedly captures images of the surroundings of the host vehicle M. The camera 10 may be a stereo camera.

The radar device 12 radiates electric waves such as millimeter waves to the surroundings of the host vehicle M and detects electric waves (reflected waves) reflected by an object to detect the position (distance and direction) of the object. The radar device 12 is attached to any portion of the host vehicle M. The radar device 12 may detect the position and speed of an object according to a frequency modulated continuous wave (FM-CW) method.

The finder 14 is a light detection and ranging (LIDAR) device. The finder 14 radiates light to the surroundings of the host vehicle M and measures scattering light. The finder 14 detects a distance to a target on the basis of a time from light emission to light reception. Radiated light may be pulse-shaped laser light, for example. The finder 14 is attached to any portion of the host vehicle M.

The object recognition device 16 performs a sensor fusion process on detection results of some or all of the camera 10, the radar device 12 and the finder 14 to recognize the position, type, speed and the like of an object. The object recognition device 16 outputs a recognition result to the automated driving control device 100. The object recognition device 16 may output detection results of the camera 10, the radar device 12 and the finder 14 to the automated driving control device 100 as they are. The object recognition device 16 may be omitted from the vehicle system 1.

The communication device 20 communicates with other vehicles around the host vehicle M using a cellular network, Wi-Fi network, Bluetooth (registered trademark), dedicated short range communication (DSRC) and the like, for example, or communicates with various server devices through a wireless base station.

The HMI 30 presents various types of information to an occupant of the host vehicle M and receives an input operation from the occupant. The HMI 30 includes various display devices, speakers, buzzers, touch panels, switches, keys, etc.

The vehicle sensor 40 includes a vehicle speed sensor that detects the speed of the host vehicle M, an acceleration sensor that detects an acceleration, a yaw rate sensor that detects an angular velocity around a vertical axis, a heading sensor that detects the direction of the host vehicle M, and the like.

The navigation device 50 includes a global navigation satellite system (GNSS) receiver 51, a navigation HMI 52 and a route determiner 53, for example. The navigation device 50 holds first map information 54 in a storage device such as a hard disk drive (HDD) or a flash memory.

The GNSS receiver 51 identifies the position of the host vehicle M on the basis of signals received from a GNSS satellite. The position of the host vehicle M may be identified or complemented by an inertial navigation system (INS) using the output of the vehicle sensor 40.

The navigation HMI 52 includes a display device, a speaker, a touch panel, keys, etc. A part or all of the navigation HMI 52 and the aforementioned HMI 30 may be made to be common.

The route determiner 53 determines a route (hereinafter, a route on a map) to a destination input by an occupant using the navigation HMI 52 from the position of the host vehicle M identified by the GNSS receiver 51 (or any input position) with reference to the first map information 54, for example. The first map information 54 is information representing road shapes according to links indicating roads and nodes connected by links, for example. The first map information 54 may include curvature and point of interest (POI) information of roads, and the like. A route on a map is output to the MPU 60.

The navigation device 50 may perform route guide using the navigation HMI 52 on the basis of roads on a map. For example, the navigation device 50 may be realized by functions of a terminal device such as a smartphone or a tablet terminal possessed by an occupant. The navigation device 50 may transmit a current position and a destination to a navigation server through the communication device 20 and acquire the same route as a route on a map from the navigation server.

The MPU 60 includes a recommended lane determiner 61, for example, and saves second map information 62 in a storage device such as an HDD or a flash memory. The recommended lane determiner 61 divides a route on a map provided from the navigation device 50 into a plurality of blocks (divides the route intervals of 100 m in a vehicle traveling direction, for example) and determines a recommended lane for each block with reference to the second map information 62. The recommended lane determiner 61 performs determination in such a manner that on which lane from the left the vehicle will travel is determined. When a route on a map includes a branch point, the recommended lane determiner 61 determines recommended lanes such that the host vehicle M can travel on a reasonable route for traveling to a branch destination.

The second map information 62 is map information with higher-accuracy than the first map information 54. For example, the second map information 62 includes information on the centers of lanes or information on the boundaries of lanes, information on lane types, and the like. The second map information 62 may include road information, traffic regulations information, address information (addresses and zip codes), facility information, telephone number information, etc. The second map information 62 may be updated at any time through communication between the communication device 20 and other devices.

The driving operator 80 includes an accelerator pedal, a brake pedal, a shift lever, a steering wheel, a modified steering wheel, a joystick and other operators, for example. A sensor that detects an operation amount or presence or absence of an operation is attached to the driving operator 80 and a detection result thereof is output to the automated driving control device 100 or some or all of the travel driving power output device 200, the brake device 210 and the steering device 220.

The automated driving control device 100 includes a first controller 120, a second controller 160 and a storage 180, for example. Each of the first controller 120 and the second controller 160 is realized by a hardware processor such as a central processing unit (CPU) executing a program (software), for example. Some or all of these components may be realized by hardware (circuit unit; including circuitry) such as a large scale integration (LSI) circuit, an application specific integrated circuit (ASIC), a field-programmable gate array (FPGA) and a graphics processing unit (GPU) or realized by software and hardware in cooperation. Programs may be stored in advance in the storage 180 of the automated driving control device 100 or stored in a detachable storage medium such as a DVD or a CD-ROM and installed in the storage 180 by setting the storage medium in a drive device.

The storage 180 is realized by an HDD, a flash memory, an electrically erasable programmable read only memory (EEPROM), a read only memory (ROM), a random access memory (RAM) or the like, for example. The storage 180 stores programs read and executed by a processor, for example.

Figure 2:
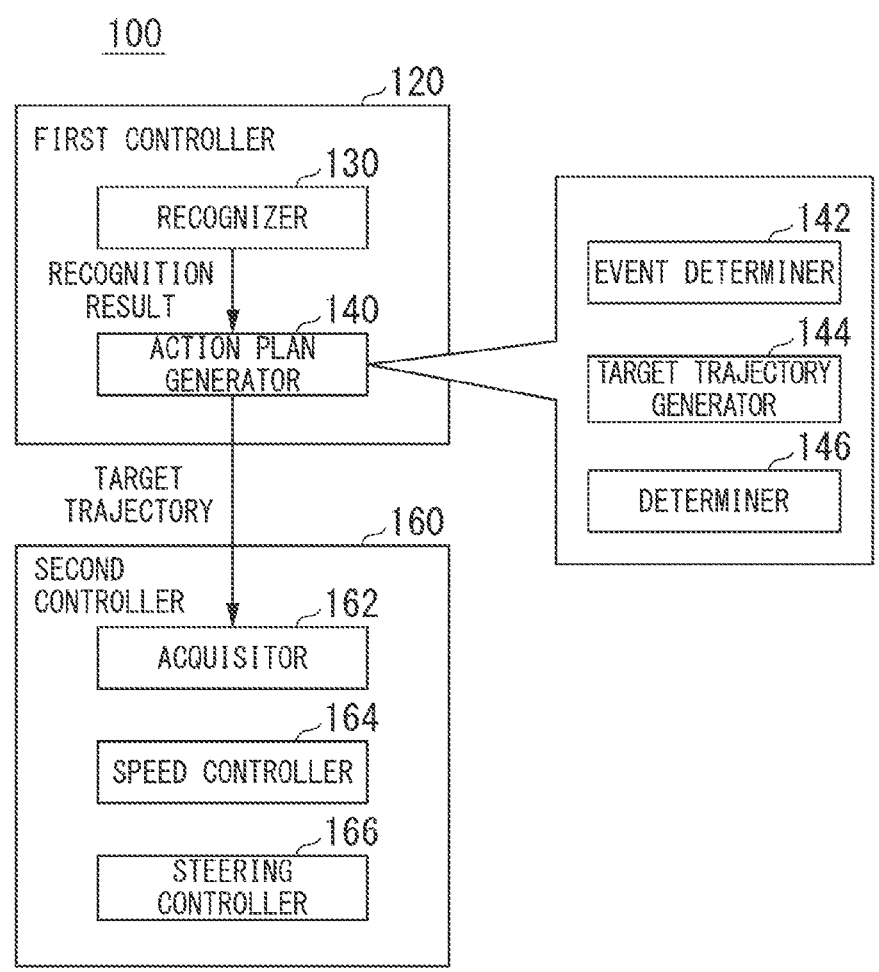
FIG. 2 is a diagram showing a functional configuration of a first controller and a second controller.

FIG. 2 is a diagram showing a functional configuration of the first controller 120 and the second controller 160. The first controller 120 includes a recognizer 130 and an action plan generator 140, for example. The first controller 120 realizes a function using artificial intelligence (AI) and a function using a model provided in advance in parallel, for example. For example, a function of "recognizing an intersection" may be realized by performing recognition of an intersection using deep learning or the like and recognition based on predetermined conditions (a signal which can be pattern-matched, road markings and the like) in parallel and assigning scores to both the recognitions to integrally evaluate the recognitions. Accordingly, automated driving reliability is guaranteed.

The recognizer 130 recognizes states such as the position, speed and acceleration of an object around the host vehicle M on the basis of information input from the camera 10, the radar device 12 and the finder 14 through the object recognition device 16. For example, the position of the object may be recognized as a position on absolute coordinates having a representative point (the center of gravity, the center of the drive shaft or the like) of the host vehicle M as the origin and used for control. The position of the object may be represented as a representative point of the object, such as the center of gravity or a corner, or may be represented as a representative region. "States" of the object may include the acceleration and jerk of the object or an "action state" (e.g., whether lane change is being performed or is intended to be performed).

The recognizer 130 recognizes a lane (traveling lane) in which the host vehicle M is traveling, for example. For example, the recognizer 130 may recognize a traveling lane by comparing a lane marking pattern (e.g., arrangement of solid lines and dashed lines) obtained from the second map information 62 with a lane marking pattern around the host vehicle M recognized from an image captured by the camera 10. The recognizer 130 may recognize a traveling lane by recognizing lane boundaries (road boundaries) including lane markings, road shoulders, curbs, medians, guardrails and the like as well as lane markings. In such recognition, the position of the host vehicle M acquired from the navigation device 50 and a processing result of the INS may be additionally taken into account. The recognizer 130 recognizes stop lines, obstacles, a red signal, tollgates and other road states.

The recognizer 130 recognizes a position and an attitude of the host vehicle M with respect to a traveling lane when the traveling lane is recognized. For example, the recognizer 130 may recognize a distance between a reference point of the host vehicle M and the center of the lane and an angle between a traveling direction of the host vehicle M and a line connecting the center of the lane as a relative position and attitude of the host vehicle M with respect to the traveling lane. Instead of this, the recognizer 130 may recognize the position of the reference point of the host vehicle M or the like with respect to any side edge of the traveling lane (a lane marking or a road boundary) as a relative position of the host vehicle M with respect to the traveling lane.

The action plan generator 140 includes an event determiner 142, a target trajectory generator 144 and a determiner 146, for example. The event determiner 142 determines an automated driving event on a route for which recommended lanes have been determined. An event is information defining a traveling state of the host vehicle M.

For example, events may include a constant-speed travel event that causes the host vehicle M to travel in the same lane at a constant speed, a following travel event that causes the host vehicle M to follow another vehicle (hereinafter referred to as a preceding vehicle) present ahead of the host vehicle M, a lane change event that causes the host vehicle M to change lanes from a host lane to a neighboring lane, a branch event that causes the host vehicle M to be branched to a lane to a destination at a branch point of a road, a merging event that causes the host vehicle M to merge to a main lane at a merging point, a takeover event for ending automated driving and switching automated driving to manual driving, and the like. For example, "following" is a traveling state in which a relative distance (distance between vehicles) between the host vehicle M and a preceding vehicle is maintained as constant. For example, events may include an overtaking event that causes the host vehicle M to change lanes to a neighboring lane first, overtake a preceding vehicle in the neighboring lane and then change lanes to the original lane again, an avoidance event that causes the host vehicle M to perform at least one of braking and steering in order to avoid approaching to an obstacle, and the like.

The event determiner 142 may change an event that has already been determined to another event or determine a new event according to a surrounding situation recognized by the recognizer 130 when the host vehicle M is traveling.

The target trajectory generator 144 generates a future target trajectory along which the host vehicle M will travel such that the host vehicle M travels in a recommended lane determined by the recommended lane determiner 61 in principle and automatically travels (without depending on an operation of a driver) in a traveling state defined by an event to cope with surrounding situations when the host vehicle M is traveling in the recommended lane. For example, a target trajectory may include a position factor that decides a future position of the host vehicle M and a speed factor that decides a future speed and the like of the host vehicle M.

For example, the target trajectory generator 144 determines a plurality of points (trajectory points) at which the host vehicle M will sequentially arrive as position elements of a target trajectory. A trajectory point is a point at which the host vehicle M will arrive for each predetermined traveling distance (e.g., approximately several meters). For example, the predetermined traveling distance may be calculated using a distance along a road when the vehicle travels along a route.

The target trajectory generator 144 determines a target speed and a target acceleration for each predetermined sampling time (e.g., approximately zero comma several seconds) as speed factors of a target trajectory. A trajectory point may be a position at which the host vehicle M will arrive at a sampling time for each predetermined sampling time. In this case, a target speed and a target acceleration are determined by the sampling time and a spacing between trajectory points. The target trajectory generator 144 outputs information representing the generated target trajectory to the second controller 160.

The determiner 146 determines whether the speed of a preceding vehicle present ahead of the host vehicle M in the host lane among one or more objects recognized by the recognizer 130 is less than a predetermined speed. For example, the predetermined speed is a speed of about 0 km/h or several km/h which is regarded as stop or a slow speed. A vehicle at a speed lower than the predetermined speed will be referred to as a "stopped vehicle" in the following description.

When it is determined that the speed of the preceding vehicle is lower than the predetermined speed, that is, when the preceding vehicle is a stopped vehicle, the determiner 146 further determines whether predetermined conditions with respect to a situation ahead of the stopped vehicle are satisfied in order to determine whether the stopped vehicle is overtaken.

For example, the predetermined conditions with respect to a situation ahead of the stopped vehicle may include various conditions such as absence of other stopped vehicles ahead of the preceding vehicle that is the stopped vehicle, and when other stopped vehicles are present ahead of the preceding vehicle that is the stopped vehicle, absence of a predetermined facility ahead of a group of such vehicles and whether the position of the first vehicle of the vehicle group is the same as the position of the predetermined facility or in front of the position of the predetermined facility in the vehicle traveling direction.

The event determiner 142 changes an event planned with respect to a section in which the host vehicle M is currently traveling to an overtaking event when the determiner 146 determines that the predetermined conditions are satisfied. In this case, the target trajectory generator 144 generates a target trajectory in response to the overtaking event. The event determiner 142 maintains the current event without changing the event planned with respect to the section in which the host vehicle M is currently traveling to the overtaking event when the determiner 146 determines that the predetermined conditions are not satisfied, that is, when the host vehicle M does not overtake the stopped vehicle. In this case, the target trajectory generator 144 generates a target trajectory in response to the current event.

When the determiner 146 determines that the predetermined conditions are satisfied, the event determiner 142 may further determine whether a time-to collision (TTC) with each of other vehicles in a neighboring lane that is a lane of a lane change destination during overtaking is equal to or longer than a predetermined time, change the event of the current section to the overtaking event when the TTC with each of other vehicles in the neighboring lane is equal to or longer than the predetermined time and maintain the event of the current section when the TTC with each of other vehicles in the neighboring lane is less than the predetermined time.

The second controller 160 controls the travel driving power output device 200, the brake device 210 and the steering device 220 such that the host vehicle M passes along the target trajectory generated by the target trajectory generator 144 on scheduled time.

For example, the second controller 160 includes an acquisitor 162, a speed controller 164 and a steering controller 166. Integration of the event determiner 142, the target trajectory generator 144 and the second controller 160 is an example of a "driving controller."

The acquisitor 162 acquires information on the target trajectory (trajectory points) generated by the target trajectory generator 144 and stores the information on a memory of the storage 180.

The speed controller 164 controls one or both of the travel driving power output device 200 and the brake device 210 on the basis of a speed factor (e.g., a target speed, a target acceleration and the like) included in the target trajectory stored in the memory.

The steering controller 166 controls the steering device 220 according to a position factor (e.g., a curvature representing a degree of bending of the target trajectory) included in the target trajectory stored in the memory.

Processing of the speed controller 164 and the steering controller 166 is realized by feedforward control and feedback control in combination, for example. As an example, the steering controller 166 performs feedforward control according to a curvature of a road ahead of the host vehicle M and feedback control based on a distance from a target trajectory in combination.

The travel driving power output device 200 outputs a travel driving power (torque) for traveling of a vehicle to driving wheels. For example, the travel driving power output device 200 may include a combination of an internal combustion engine, a motor, a transmission and the like, and a power electronic controller (ECU) which controls combination thereof. The power ECU controls the aforementioned components according to information input from the second controller 160 or information input from the driving operator 80.

The brake device 210 includes a brake caliper, a cylinder which transfers a hydraulic pressure to the brake caliper, an electric motor which generates a hydraulic pressure in the cylinder, and a brake ECU, for example. The brake ECU controls the electric motor according to information input from the second controller 160 and information input from the driving operator 80 such that a brake torque according to the control operation is output to each vehicle wheel. The brake device 210 may include a mechanism for transferring an oil pressure generated by an operation of the brake pedal included in the driving operator 80 to the cylinder through a master cylinder as a backup. The brake device 210 is not limited to the above-described configuration and may be an electronically controlled hydraulic brake device which controls an actuator according to information input from the second controller 160 and transfers an oil pressure of a master cylinder to a cylinder.

The steering device 220 includes a steering ECU and an electric motor, for example. For example, the electric motor may change the direction of the steering wheel by applying a force to a rack-and-pinion mechanism. The steering ECU drives the electric motor according to information input from the second controller 160 or information input from the driving operator 80 to change the direction of the steering wheel.

[Process Flow]

Figure 3:
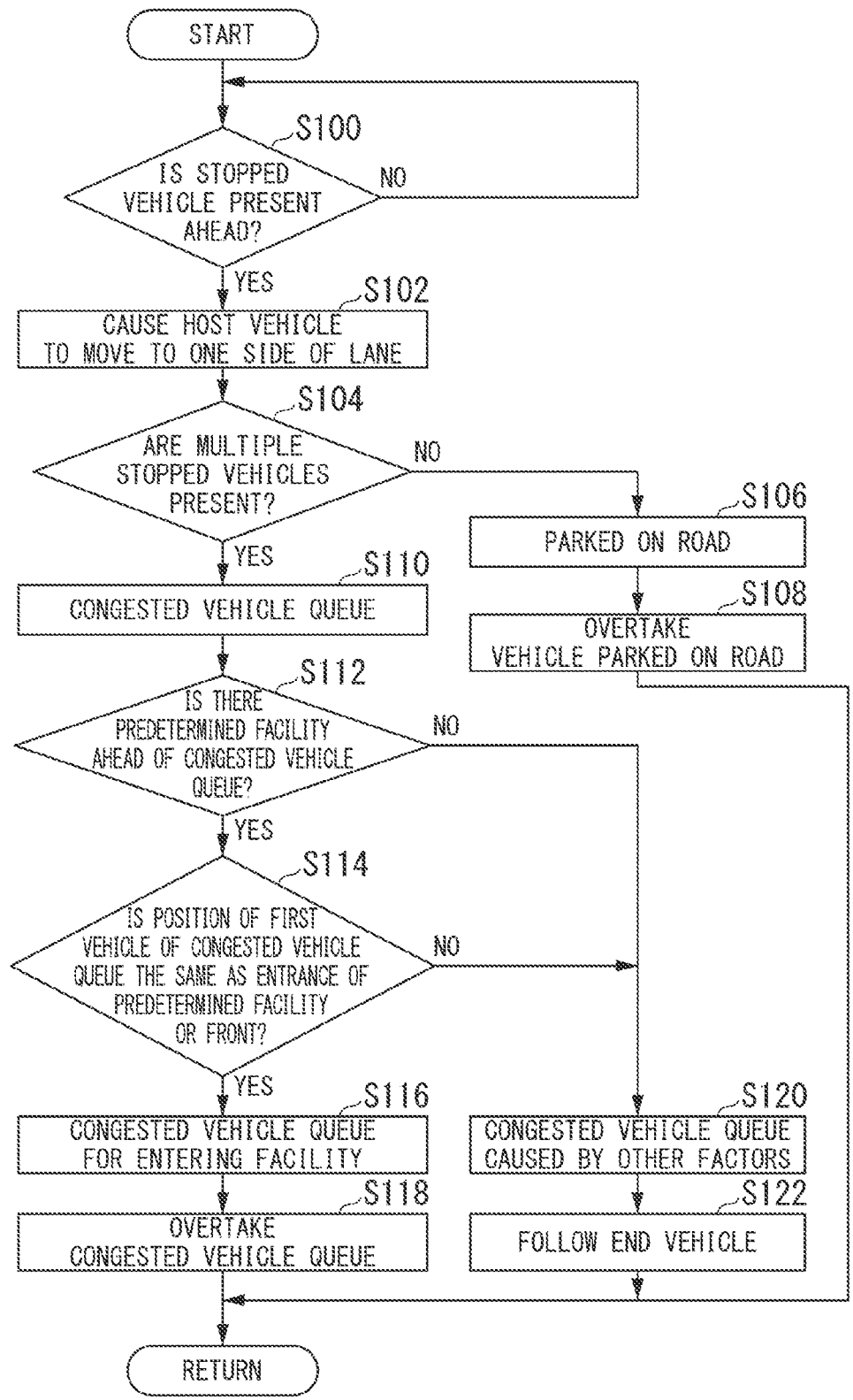
FIG. 3 is a flowchart showing an example of a flow of a series of processes performed by an automated driving control device of the first embodiment.

Hereinafter, a flow of a series of processes performed by the automated driving control device 100 of the first embodiment will be described using a flowchart. FIG. 3 is a flowchart showing an example of a flow of a series of processes performed by the automated driving control device 100 of the first embodiment. For example, the process of this flowchart may be repeated at predetermined time intervals. Through this flowchart, a case in which other vehicles are not present in a neighboring lane that is an overtaking lane will be described for simplification of description.

First, the determiner 146 determines whether a stopped vehicle is present ahead of the host vehicle M on the basis of a recognition result of the recognizer 130 (step S100). That is, the determiner 146 determines whether a preceding vehicle is present and whether the speed of a preceding vehicle is less than a predetermined speed.

The target trajectory generator 144 generates a target trajectory along which the host vehicle M will travel to (become closer to) a position biased to either of the left or right from the center of the host lane when the determiner 146 determines that a stopped vehicle is present ahead of the host vehicle M, that is, the determiner 146 determines that the speed of the preceding vehicle is less than the predetermined speed. The second controller 160 causes the host vehicle M to become closer to one side of the host lane by controlling the speed and steering of the host vehicle M along the target trajectory (step S102). Accordingly, the camera 10, the radar device 12 and the finder detect surrounding objects from different views, and thus the recognizer 130 can easily recognize a situation further ahead of the preceding vehicle.

Subsequently, the determiner 146 determines whether a plurality of stopped vehicles are present further ahead of the preceding vehicle determined to be a stopped vehicle in the host lane on the basis of the recognition results of the recognizer 130 (step S104). For example, when a plurality of stopped vehicles are not present within a predetermined distance $D_{X1}$ ahead of the preceding vehicle, the determiner 146 may determine that a plurality of stopped vehicles are not present ahead of the preceding vehicle.

When it is determined that a plurality of stopped vehicles are not present ahead of the preceding vehicle, the determiner 146 determines that the preceding vehicle determined to be a stopped vehicle is a vehicle parked on a road (step S106).

Subsequently, the event determiner 142 changes an event planned in the current section to an overtaking event and the target trajectory generator 144 generates a target trajectory for overtaking the preceding vehicle parked on the road on the basis of the overtaking event. In response to this, the second controller 160 causes the host vehicle M to change lanes to a neighboring lane first, overtake the preceding vehicle in the neighboring lane and then change lanes again to the original lane by controlling the speed and steering of the host vehicle M (step S108).

Figure 4:
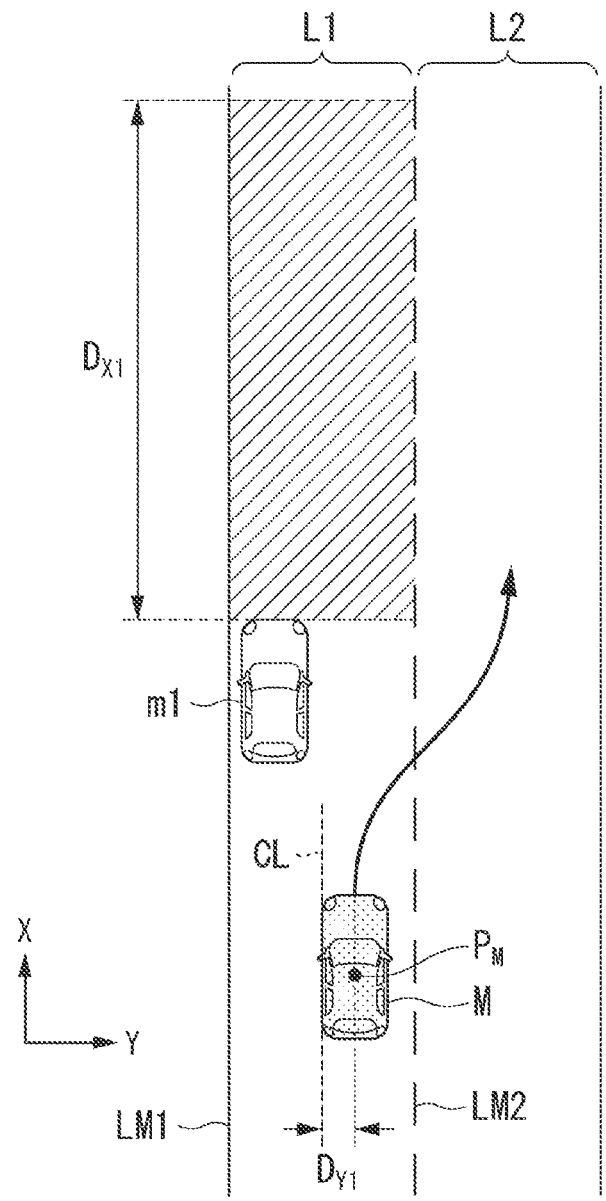
FIG. 4 is a diagram showing an example of a situation in which a preceding vehicle parked on a road is overtaken.

FIG. 4 is a diagram showing an example of a situation in which a preceding vehicle parked on a road is overtaken. In the figure, m1 represents the preceding vehicle, L1 represents a host lane and L2 represents a neighboring lane. LM1 represents a left marking with respect to the traveling direction of the host vehicle M between two markings that mark out the host lane L1 and LM2 represents a right marking with respect to the traveling direction of the host vehicle M between the two markings that mark out the host lane L1.

In the illustrated example, the host vehicle M is closer to the side of the marking LM2 (right side) such that the reference point $P_M$ of the host vehicle M is a certain distance $D_{Y1}$ away from the center CL of the host lane L1 in the vehicle width direction Y to allow the recognizer 130 to easily perform recognition from further ahead of the preceding vehicle m1. Since other stopped vehicles are not present within the predetermined distance $D_{X1}$ ahead of the preceding vehicle m1, the event determiner 142 plans an overtaking event. As a result, the host vehicle M changes lanes to the neighboring lane L2 to overtake the preceding vehicle m1 first.

On the other hand, when it is determined that a plurality of stopped vehicles are present ahead of the preceding vehicle, the determiner 146 determines that a vehicle group including the plurality of stopped vehicles present ahead of the preceding vehicle and the preceding vehicle is a vehicle queue formed due to traffic congestion (hereinafter referred to as a congested vehicle queue) (step S110).

Subsequently, the determiner 146 determines whether a predetermined facility is present along the host lane in the direction of the congested vehicle queue on a map represented by the first map information 54 and the second map information 62 (step S112). For example, the predetermined facility may include facilities at which congestion easily occurs near entrances thereof, such as stores, venues for events (convention facilities), sightseeing facilities and leisure facilities.

When it is determined that a predetermined facility is present along the host lane in the direction of the congested vehicle queue on the map, the determiner 146 further determines whether the first vehicle $m_{TOP}$ of the congested vehicle queue is present at the same position as the entrance of the predetermined facility or a position in front of the entrance of the predetermined facility in the traveling direction of the host vehicle M (step S114).

For example, when a place at which an entrance road that leads to the predetermined facility is connected to the road on which the host vehicle M is traveling is present on the map represented by the first map information 54 and the second map information 62, the determiner 146 converts a distance to the first vehicle $m_{TOP}$ of the congested vehicle queue (i.e., the length of the congested vehicle queue) recognized by the recognizer 130 using the scale of the map and specifies a point the distance converted using the scale of the map away from the position of the host vehicle M as the position of the first vehicle $m_{TOP}$.

In addition, the determiner 146 compares the connecting place of the entrance road leading to the predetermined facility with the position of the first vehicle $m_{TOP}$ on the map, determines that the first vehicle $m_{TOP}$ of the congested vehicle queue is present at a position in front of the entrance of the predetermined facility when the connecting place is present on the back side of the position of the first vehicle $m_{TOP}$ of the congested vehicle queue in the traveling direction of the host vehicle M, and determines that the first vehicle $m_{TOP}$ of the congested vehicle queue is present at the same position as the entrance of the predetermined facility when the connecting place is the same as the position of the first vehicle $m_{TOP}$ of the congested vehicle queue within a predetermined error range (predetermined range) in the traveling direction of the host vehicle M.

For example, when the communication device 20 performs vehicle-to-vehicle communication with the first vehicle $m_{TOP}$ included in the congested vehicle queue and acquires information on a destination and positional information such as GNSS information from the first vehicle $m_{TOP}$ that is a communication partner, the determiner 146 may determine that the first vehicle $m_{TOP}$ of the congested vehicle queue is present at a position in front of the entrance of the predetermined facility if the destination of the first vehicle $m_{TOP}$ is the predetermined facility and the position represented by the positional information of the first vehicle $m_{TOP}$ is in front of the position of the predetermined facility when viewed from the position of the host vehicle M on the map, and determine that the first vehicle $m_{TOP}$ of the congested vehicle queue is present at the same position as the entrance of the predetermined facility if the position represented by the positional information of the first vehicle $m_{TOP}$ is the same as the position of the predetermined facility within the predetermined error range.

When it is determined that the first vehicle $m_{TOP}$ of the congested vehicle queue is present at the same position as the entrance of the predetermined facility or a position in front of the entrance of the predetermined facility, that is, when predetermined conditions are satisfied, the determiner 146 determines that the congested vehicle queue ahead of the host vehicle M determined in the process of S110 is a congested vehicle queue for entering the predetermined facility (step S116).

Subsequently, the event determiner 142 changes the event planned in the current section to the overtaking event and the target trajectory generator 144 generates a target trajectory for overtaking the congested vehicle queue on the basis of the overtaking event. In response to this, the second controller 160 causes the host vehicle M to change lanes to a neighboring lane first, overtake the congested vehicle queue in the neighboring lane and then change lane again to the original lane by controlling the speed and steering of the host vehicle on the basis of the target trajectory (step S118).

Figure 5:
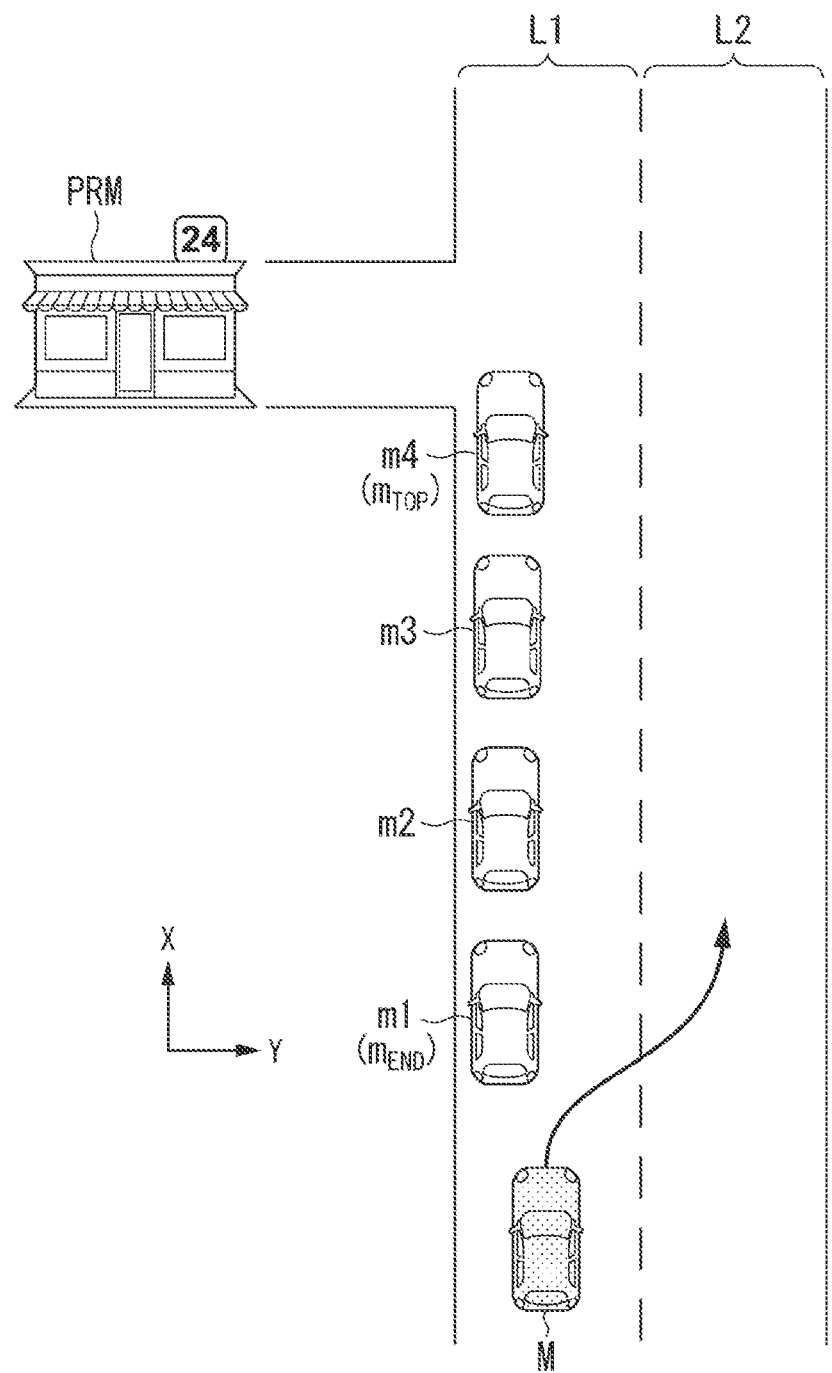
FIG. 5 is a diagram showing an example of a situation in which a congested vehicle queue is overtaken.

FIG. 5 is a diagram showing an example of a situation in which a congested vehicle queue is overtaken. In the figure, PRM represents a predetermined facility and m1 to m4 represent the congested vehicle queue. The vehicle m4 among the vehicles m1 to m4 forming the congested vehicle queue is the first vehicle $m_{TOP}$ and the vehicle m1 is an end vehicle $m_{END}$ of the congested vehicle queue and a preceding vehicle. In the illustrated example, since a place at which an entrance road that leads to the predetermined facility is connected to the road on which the host vehicle M is located is present on the back side of the position of the first vehicle $m_{TOP}$ of the congested vehicle queue or at the same position as the position of the first vehicle $m_{TOP}$ in the traveling direction X of the host vehicle M, the determiner 146 determines that the congested vehicle queue ahead of the host vehicle M is a congested vehicle queue for entering the predetermined facility. In response to this, the event determiner 142 plans the overtaking event, the target trajectory generator 144 generates a target trajectory in response to the overtaking event, and the second controller 160 causes the host vehicle M to overtake the congested vehicle queue by controlling the speed and steering of the host vehicle M on the basis of the target trajectory.

On the other hand, when it is determined that the predetermined facility is not present in the direction of the congested vehicle queue in the process of S112 or it is determined that the first vehicle $m_{TOP}$ of the congested vehicle queue is present on the back side of the entrance of the predetermined facility in the process of S114, the determiner 146 determines that the congested vehicle queue ahead of the host vehicle M determined in the process of S110 is a congested vehicle queue generated due to other factors instead of a contested vehicle queue for entering the predetermined facility (step S120). For example, other factors may include a vehicle approaching a point at which traffic is restricted, such as an intersection or a crossing, and a vehicle approaching a point at which traffic has been temporarily restricted due to an accident and the like.

Subsequently, the event determiner 142 changes the event planned in the current section to a following travel event if an event is not the following travel event and maintains the event if the event is the following travel event. The target trajectory generator 144 generates a target trajectory for following the end vehicle $m_{END}$ (i.e., the preceding vehicle) at the end of the congested vehicle queue on the basis of the following travel event. In response to this, the second controller 160 causes the host vehicle M to follow the preceding vehicle by controlling at least the speed of the host vehicle M on the basis of the target trajectory such that the distance between the host vehicle M and the preceding vehicle becomes constant (step S122). Accordingly, the process of this flowchart ends.

Figure 6:
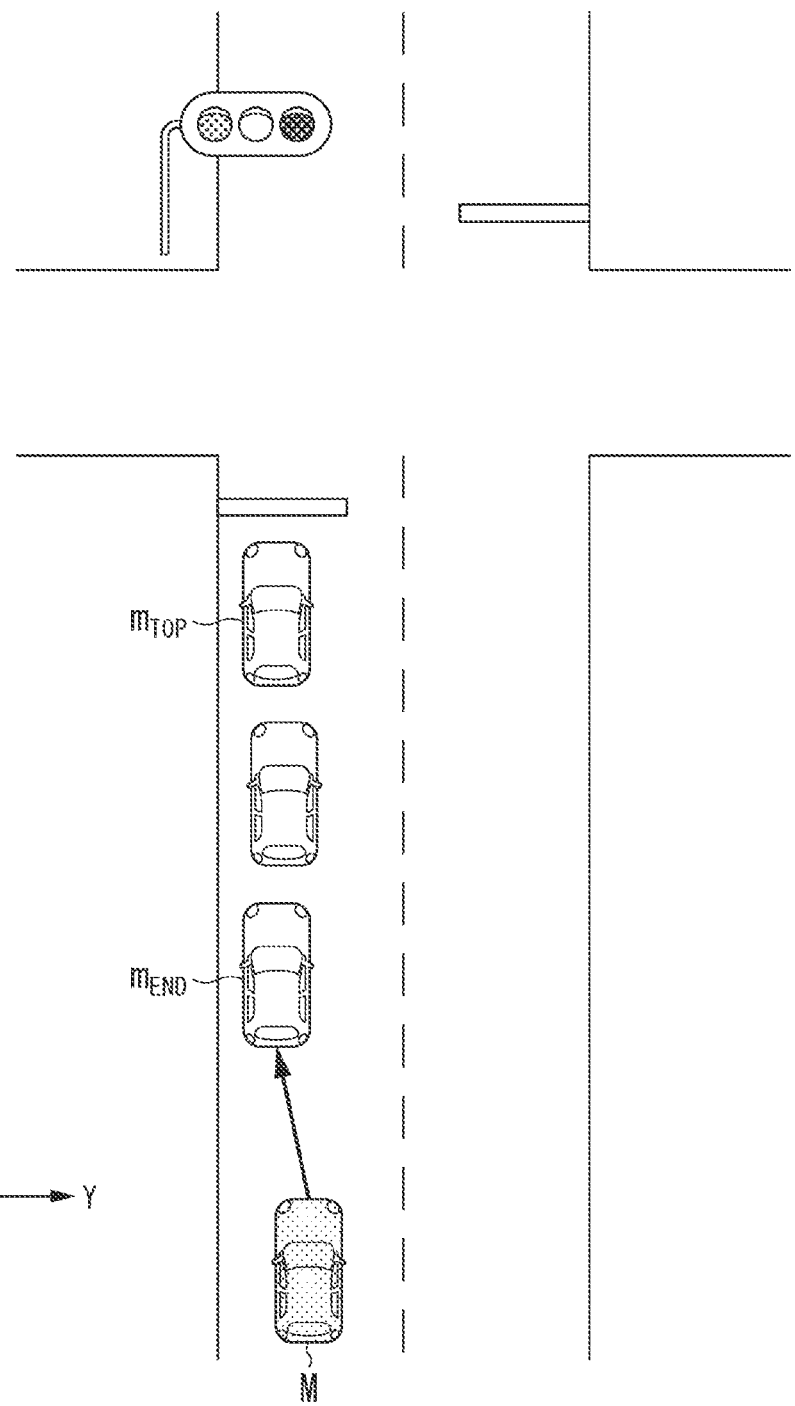
FIG. 6 is a diagram showing an example of a situation in which a congested vehicle queue is not overtaken.

FIG. 6 is a diagram showing an example of a situation in which a congested vehicle queue is not overtaken. In the illustrated example, an intersection instead of a predetermined facility is present in the direction of the congested vehicle queue. In such a case, the determiner 146 determines that the congested vehicle queue ahead of the host vehicle M is a congested vehicle queue generated due to other factors. In the illustrated example, a congested vehicle queue has been formed since advancing of the vehicles has been restricted due to a traffic signal at the intersection. In response to this, the event determiner 142 plans the following travel event, the target trajectory generator 144 generates a target trajectory in response to the following travel event, and the second controller 160 causes the host vehicle M to follow the end vehicle $m_{END}$ of the congested vehicle queue by controlling at least the speed of the host vehicle M on the basis of the target trajectory.

Although determination of whether a congested vehicle queue ahead of the host vehicle M is a congested vehicle queue for entering a predetermined facility or a congested vehicle queue caused by other factors by determining whether the first vehicle $m_{TOP}$ of the congested vehicle queue is present at the same position as the entrance of the predetermined facility or a position in front of the entrance of the predetermined facility in the traveling direction of the host vehicle M when the predetermined facility is present in front of the congested vehicle queue has been described as the determination processes of S112 and S114 (processes for determining whether predetermined conditions are satisfied) in the above-described flowchart, the present invention is not limited thereto.

For example, the determiner 146 may determine whether a congested vehicle queue ahead of the host vehicle M is a congested vehicle queue for entering a predetermined facility or a congested vehicle queue caused by other factors by determining whether one congested vehicle queue is formed over a plurality of lanes in addition to or instead of the determination processes of S112 and S114.

Figure 7:
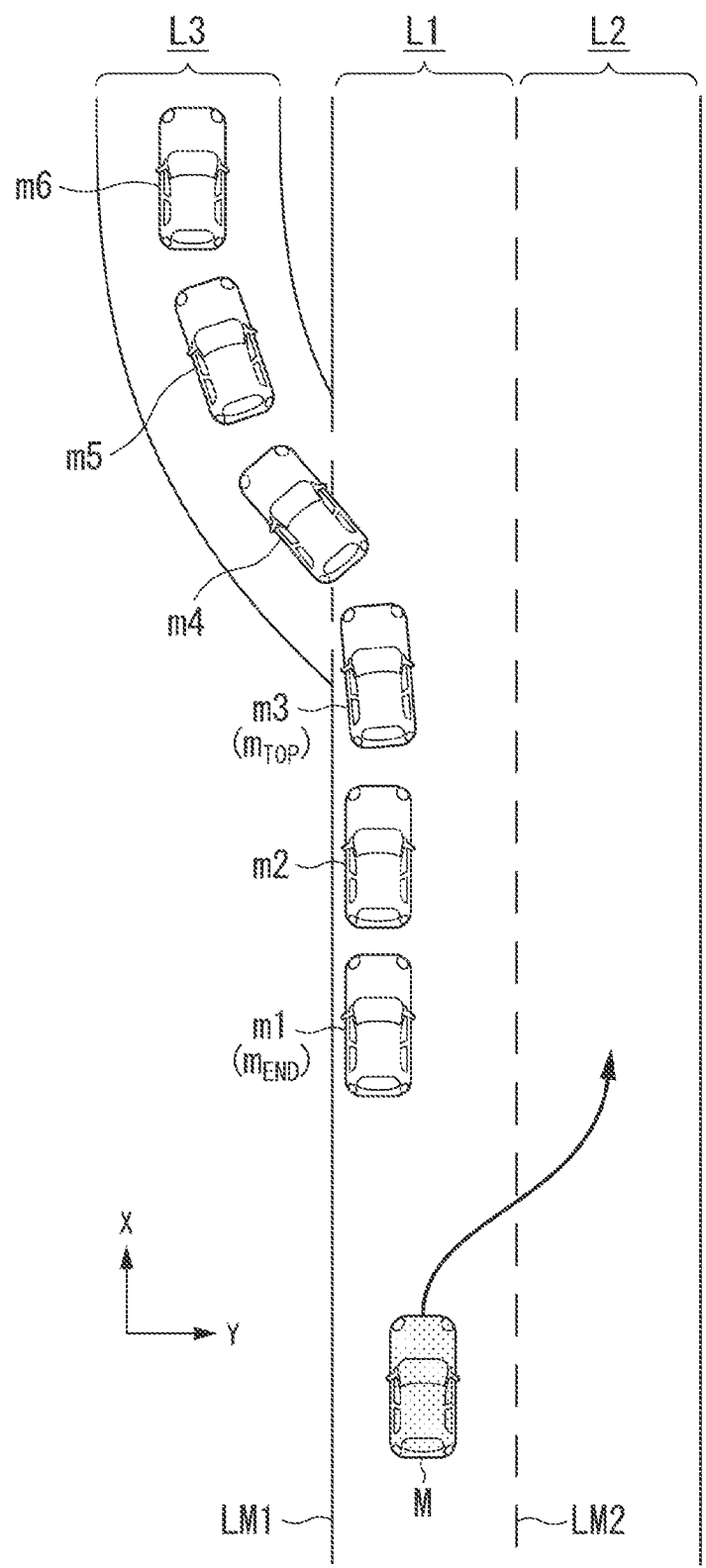
FIG. 7 is a diagram showing an example of a situation in which a congested vehicle queue is formed on a plurality of lanes.

FIG. 7 is a diagram showing an example of a situation in which one congested vehicle queue is formed over a plurality of lanes. In the figure, L1 represents a host lane, L2 represents a neighboring lane adjacent to the host lane L1 and L3 represents a lane branching from the host lane L1 and a dedicated lane for entering a predetermined facility. For example, it may be assumed that information about a lane type which indicates that the lane L3 is a dedicated lane is included in the second map information 62. In the illustrated example, a group of a plurality of vehicles m1 to m6 forms one congested vehicle queue over the dedicated lane L3 to the host lane L1.

In such a case, when the recognizer 130 recognizes that a part of the congested vehicle queue is present on a marking LM1 at the side of the dedicated lane L3 between two markings that mark the host lane L1, the determiner 146 determines that the congested vehicle queue ahead of the host vehicle M is a congested vehicle queue for entering the predetermined facility. When the communication device 20 performs vehicle-to-vehicle communication with each vehicle included in the congested vehicle queue to obtain positional information from each vehicle, the determiner 146 may determine that the congested vehicle queue ahead of the host vehicle M is a congested vehicle queue for entering the predetermined facility when a line connecting positions represented by positional information of the vehicles included in the congested vehicle queue intersects the marking LM1 of the host lane L1 at the side of the dedicated lane L3. When the congested vehicle queue ahead of the host vehicle M is determined as a congested vehicle queue for entering the predetermined facility, the determiner 146 determines that the host vehicle M will overtake a vehicle group from the preceding vehicle m1 that is the end vehicle $m_{END}$ the vehicle m3 that is the first vehicle $m_{TOP}$ in the host lane L1 in the congested vehicle queue extending from the dedicated lane L3 to the host lane L1.

For example, the determiner 146 may determine whether the congested vehicle queue ahead of the host vehicle M is a congested vehicle queue for entering the predetermined facility or a congested vehicle queue caused by other factors on the basis of the inclination of the first vehicle $m_{TOP}$ of the congested vehicle queue with respect to the host lane in addition to or instead of the determination processes of S112 and S114.

Figure 8:
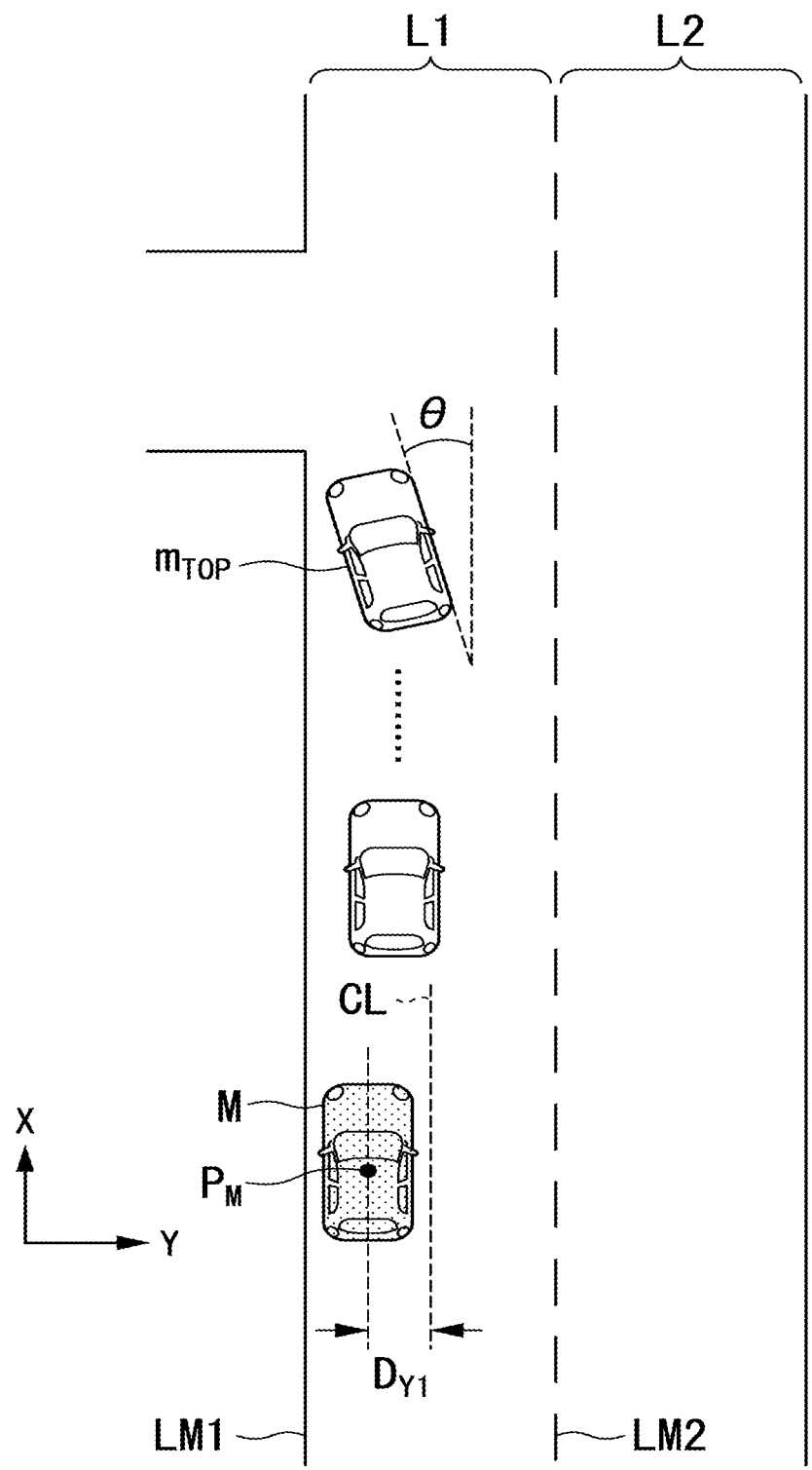
FIG. 8 is a diagram showing an example of a situation in which the first vehicle of a congested vehicle queue is inclined with respect to a host lane.

FIG. 8 is a diagram showing an example of a situation in which the first vehicle $m_{TOP}$ of a congested vehicle queue is inclined with respect to a host lane. For example, when an inclination of the first vehicle $m_{TOP}$ is confirmed, the target trajectory generator 144 may generate a target trajectory along which the host vehicle M will become closer to the left side of the host lane L1 if left-handed traffic regulations apply in the pre-process (process of S102) for determining whether a plurality of stopped vehicles are present ahead of the preceding vehicle. More specifically, the target trajectory generator 144 generates a target trajectory such that the reference point $P_M$ of the host vehicle M is a certain distance $D_{y1}$ away from the center CL of the host lane L1 to the side of the marking LM1 (left side) in the vehicle width direction Y. In response to this, the second controller 160 controls the speed and steering of the host vehicle M on the basis of the target trajectory to cause the host vehicle M to become closer to the side of the marking LM1 (left side). As a result, the recognizer 130 recognizes the front from the left side of the rear of the congested vehicle queue and recognizes the inclination of the first vehicle $m^{TOP}$ with respect to the marking that marks the host lane L1, for example. For example, the inclination may be obtained as an angle θ formed by the direction of the overall length of the body of the first vehicle $m_{TOP}$ with respect to the marking. For example, the determiner 146 may determine that the congested vehicle queue in front of the host vehicle M is a congested vehicle queue for entering a predetermined facility when the formed angle θ is equal to or greater than a threshold value. The threshold value may be about 30 to 60 degrees, for example.

For example, the determiner 146 may determine whether a congested vehicle queue ahead of the host vehicle M is a congested vehicle queue for entering a predetermined facility or a congested vehicle queue caused by other factors according to whether one or more of a plurality of other vehicles (including the first vehicle $m_{TOP}$ and the preceding vehicle) included in the congested vehicle queue has turned on turn indicators in addition to or instead of the determination processes of S112 and S114. A turn indicator may include a switch (lever) operated by an occupant, an electronic circuit that operates (lights up or caused to blink) a turn lamp using a switch, an indicator that displays an operation state of a turn lamp to an occupant, etc.

Figure 9:
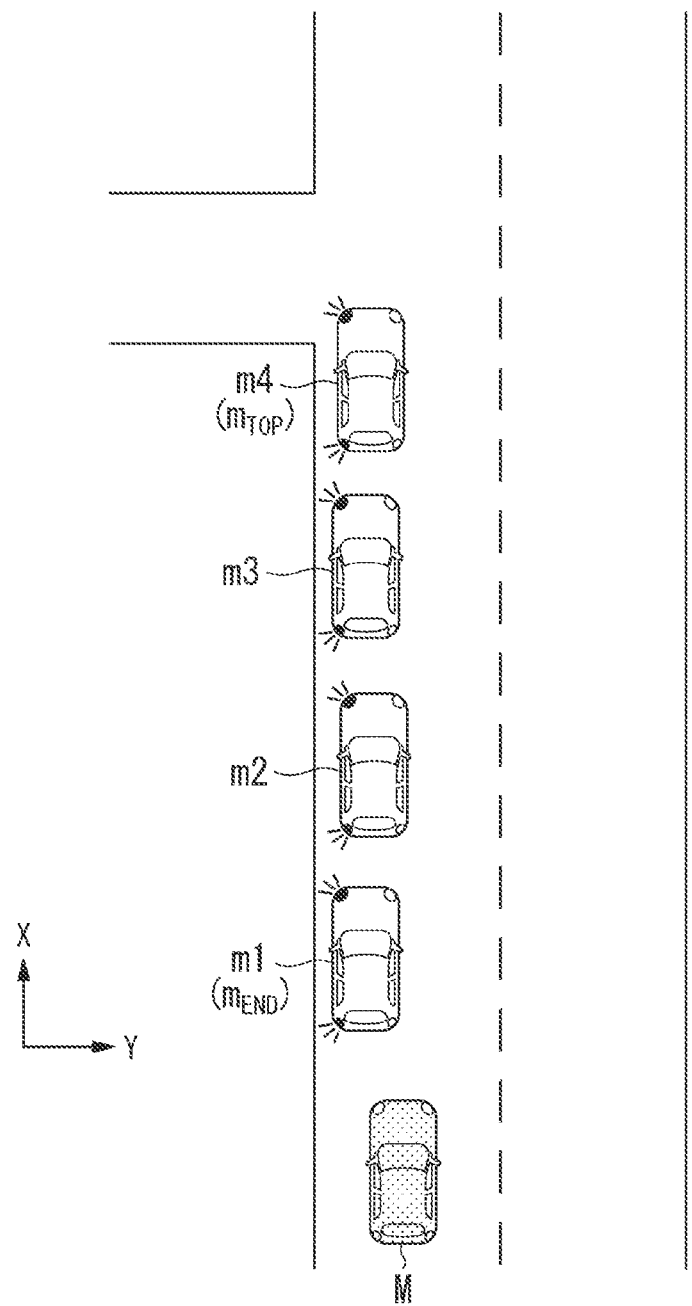
FIG. 9 is a diagram showing an example of a situation in which other vehicles included in a congested vehicle queue turn on turn indicators.

FIG. 9 is a diagram showing an example of a situation in which other vehicles included in a congested vehicle queue turn on turn indicators. In the illustrated example, four vehicles m1 to m4 included in the congested vehicle queue turn on turn indicators. In this case, the determiner 146 may determine that the congested vehicle queue ahead of the host vehicle M is a congested vehicle queue for entering a predetermined facility. The determiner 146 may exclude a vehicle far away from the first vehicle $m_{TOP}$ among the plurality of vehicles included in the congested vehicle queue from the target of determination of lighting of turn indicators. In general, when over several vehicles intended to turn left and enter a store and the like are congested, a vehicle closer to the end of the congestion has a longer distance to the left-turn point. In such a case, a vehicle closer to the end tends to wait advancing of the vehicle ahead thereof without turning on the turn indicator. Accordingly, the determiner 146 may increase the number of vehicles excluded from the target of determination from the end vehicle as the congested vehicle queue (the number of vehicles included in the congested vehicle queue) increases in such a manner that only the end vehicle is excluded from the target of determination if the congested vehicle queue includes four vehicles, the end vehicle and one vehicle ahead of the end vehicle are excluded from the target of determination if the congested vehicle queue includes five vehicles, and the end vehicle and two vehicles ahead of the end vehicle are excluded from the target of determination if the congested vehicle queue includes six vehicles.

For example, the determiner 146 may determine whether the congested vehicle queue is present at a position biased to the side of a road side strip (road shoulder) from the center of the host lane, and when it is determined that the congested vehicle queue is present at a position biased to the side of a road shoulder from the center of the host lane, determine that the congested vehicle queue ahead of the host vehicle M is a congested vehicle queue for entering the predetermined facility in addition to or instead of the determination processes of S112 and S114.

Although the determination processes of S112 and S114 are performed on the assumption the first map information 54 and the second map information 62 includes information about the predetermined facility, such as the position of the predetermined facility and a connecting place of an entrance road leading to the predetermined facility have been described in the aforementioned flowchart, the present invention is not limited thereto.

For example, when the first map information 54 and the second map information 62 do not include information about the predetermined facility, such as the position of the predetermined facility or a connecting place of an entrance road leading to the predetermined facility, the determiner 146 may determine whether the first vehicle $m_{TOP}$ of the congested vehicle queue is present at the same position as the entrance of the predetermined facility or a position in front of the entrance of the predetermined facility using only a recognition result of the recognizer 130. When the first map information 54 and the second map information 62 do not include information about the predetermined facility, the determination processes of S112 and S114 may be omitted.

Figure 10:
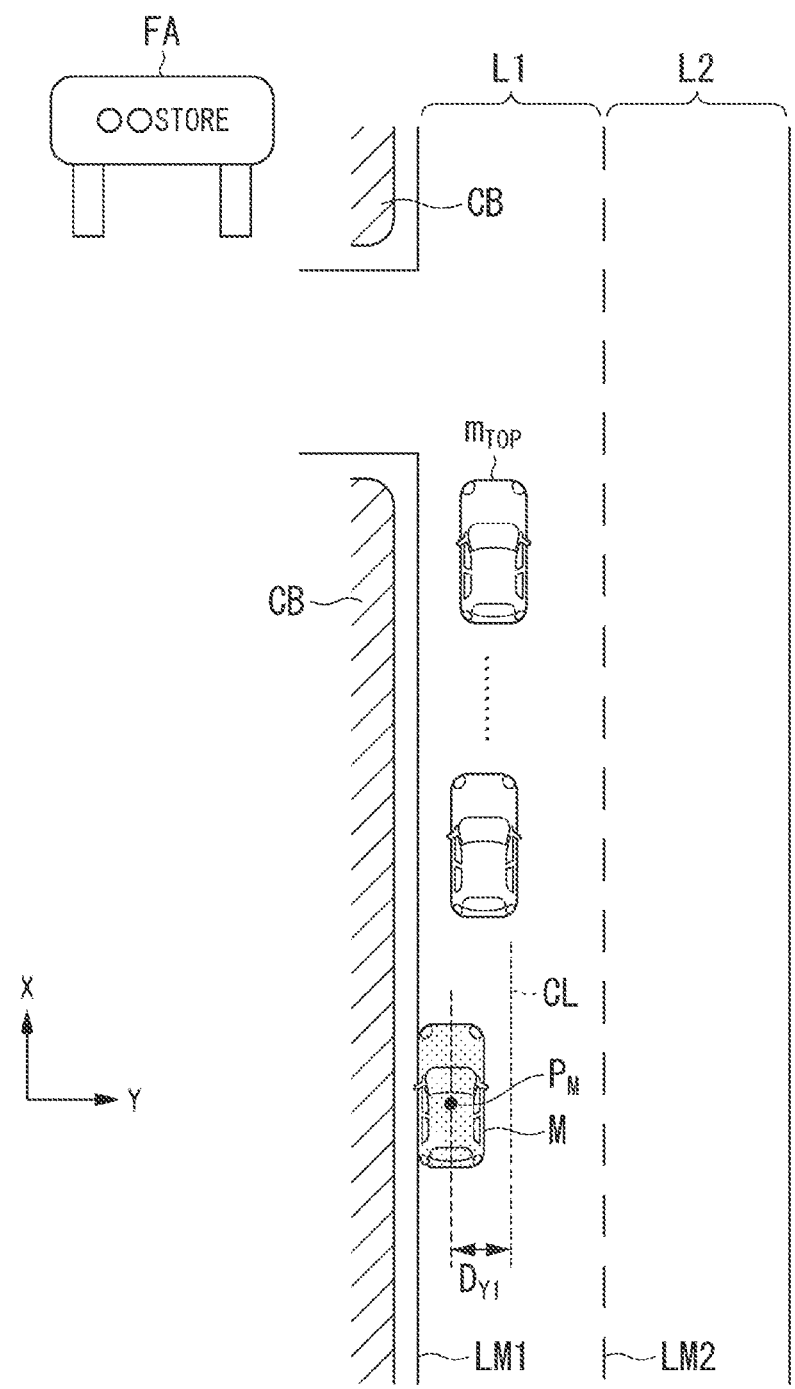
FIG. 10 is a diagram showing an example of a situation in which positions of the first vehicle and a predetermined facility are compared on the basis of a recognition result of a recognizer.

FIG. 10 is a diagram showing an example of a situation in which the position of the first vehicle $m_{TOP}$ is compared with the position of a predetermined facility on the basis of a recognition result of the recognizer 130. In the figure, CB represents a curb of a road side strip and FA represents a guide signboard indicating the entrance of the predetermined facility. For example, when the first map information 54 or the second map information 62 does not include information about the predetermined facility, the target trajectory generator 144 generates a target trajectory along which the host vehicle M will be closer to the left side of the host lane L1 if the left-handed traffic regulation is applied as the process of S102. More specifically, the target trajectory generator 144 generates a target trajectory such that the reference point $P_M$ of the host vehicle M is a certain distance $D_{Y1}$ away from the center CL of the host lane L1 to the side of the marking LM1 in the vehicle width direction Y. That is, the target trajectory generator 144 generates a target trajectory such that the host vehicle M moves closer to the side of the curbs CB. In response to this, the second controller 160 controls the speed and steering of the host vehicle M on the basis of the target trajectory to cause the host vehicle M to move closer to the side of the marking LM1 (left side). As a result, the recognizer 130 recognizes the front from the left side of the rear of the congested vehicle queue and recognizes a seam of the curbs CB extending along a road and the guide signboard FA installed near the entrance of the predetermined facility, for example.

When the recognizer 130 recognizes a seam of the curbs CB and the guide signboard FA, the determiner 146 compares a distance to the seam of the curbs CB or the guide signboard FA with a distance to the first vehicle $m_{TOP}$ of the congested vehicle queue. Then, the determiner 146 determines that the first vehicle $m_{TOP}$ of the congested vehicle queue is present at a position in front of the entrance of the predetermined facility when the distance to the first vehicle $m_{TOP}$ of the congested vehicle queue is shorter than the distance to the seam of the curbs CB or the guide signboard FA and determines that the first vehicle $m_{TOP}$ of the congested vehicle queue is present at the same position as the entrance of the predetermined facility when a difference between the distance to the first vehicle $m_{TOP}$ of the congested vehicle queue and the distance to the seam of the curbs CB or the guide signboard FA is within a predetermined error range. Since the distance to the first vehicle $m_{TOP}$ of the congested vehicle queue is shorter than the distance to the seam of the curbs CB or the guide signboard FA in the illustrated example, the determiner 146 determines that the first vehicle $m_{TOP}$ of the congested vehicle queue is present at a position in front of the entrance of the predetermined facility.

When the recognizer 130 recognizes a plurality of seams of the curbs CB, the determiner 146 may determine whether the first vehicle $m_{TOP}$ of the congested vehicle queue is present at the same position as the entrance of the predetermined facility or at a position in front of the entrance of the predetermined facility by comparing a distance to a seam of the curbs CB closest to the guide signboard FA among the plurality of seams of the curbs CB with the distance to the first vehicle $m_{TOP}$.

According to the above-described first embodiment, it is possible to overtake a preceding vehicle more appropriately according to surrounding traffic conditions by including the recognizer 130 which recognizes objects around the host vehicle M, the determiner 146 which determines whether the speed of a preceding vehicle present ahead of the host vehicle M among one or more objects recognized by the recognizer 130 in the host lane in which the host vehicle M is present is less than a predetermined speed and determines whether predetermined conditions with respect to conditions ahead of the preceding vehicle are satisfied when it is determined that the speed of the preceding vehicle is less than the predetermined speed, the target trajectory generator 144 which generates a target trajectory for overtaking the preceding vehicle when the determiner 146 determines that the predetermined conditions are satisfied, and the second controller 160 which causes the host vehicle M to overtake the preceding vehicle by controlling the speed and steering of the host vehicle M on the basis of the target trajectory generated by the target trajectory generator 144.

Second Embodiment

Hereafter, a second embodiment will be described. The second embodiment differs from the above-described first embodiment in that the predetermined conditions with respect to a condition ahead of a stopped vehicle include presence of an intersection at which a congested vehicle queue is likely to turn right or left ahead of the stopped vehicle and separation of the first vehicle $m_{TOP}$ of the congested vehicle queue from the intersection by a predetermined distance $D_{X2}$ or more Hereinafter, description will focus on a difference from the first embodiment and description of functions and the like in common with the first embodiment will be omitted.

The determiner 146 in the second embodiment determines whether an intersection is present ahead of a preceding vehicle and the first vehicle $m_{TOP}$ of a congested vehicle queue is separated from the intersection by the predetermined distance $D_{X2}$ or more in the traveling direction of the vehicle, determines that the predetermined conditions are not satisfied (the congested vehicle queue is not overtaken) when it is determined that the first vehicle $m_{TOP}$ of the congested vehicle queue is not separated from the intersection by the predetermined distance $D_{X2}$ or more and determines that the predetermined conditions are satisfied (the congested vehicle queue is overtaken) when it is determined that the first vehicle $m_{TOP}$ of the congested vehicle queue is separated from the intersection by the predetermined distance $D_{X2}$ or more. For example, the predetermined distance $D_{X2}$ may be a distance of about several meters from the edge of the intersection or may be a distance of about tens of meters from the edge of the intersection in consideration of presence of a crosswalk near the intersection.

Figure 11:
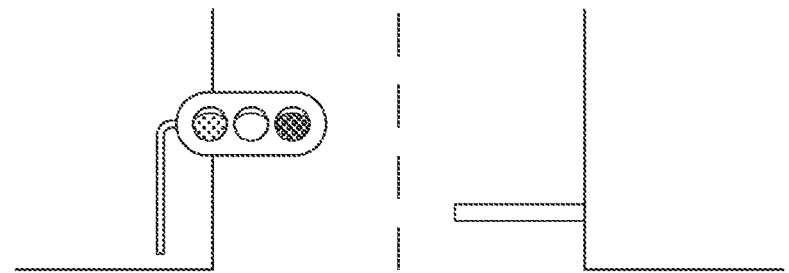
FIG. 11 is a diagram showing another example of a situation in which a congested vehicle queue is not overtaken.
Figure 11:
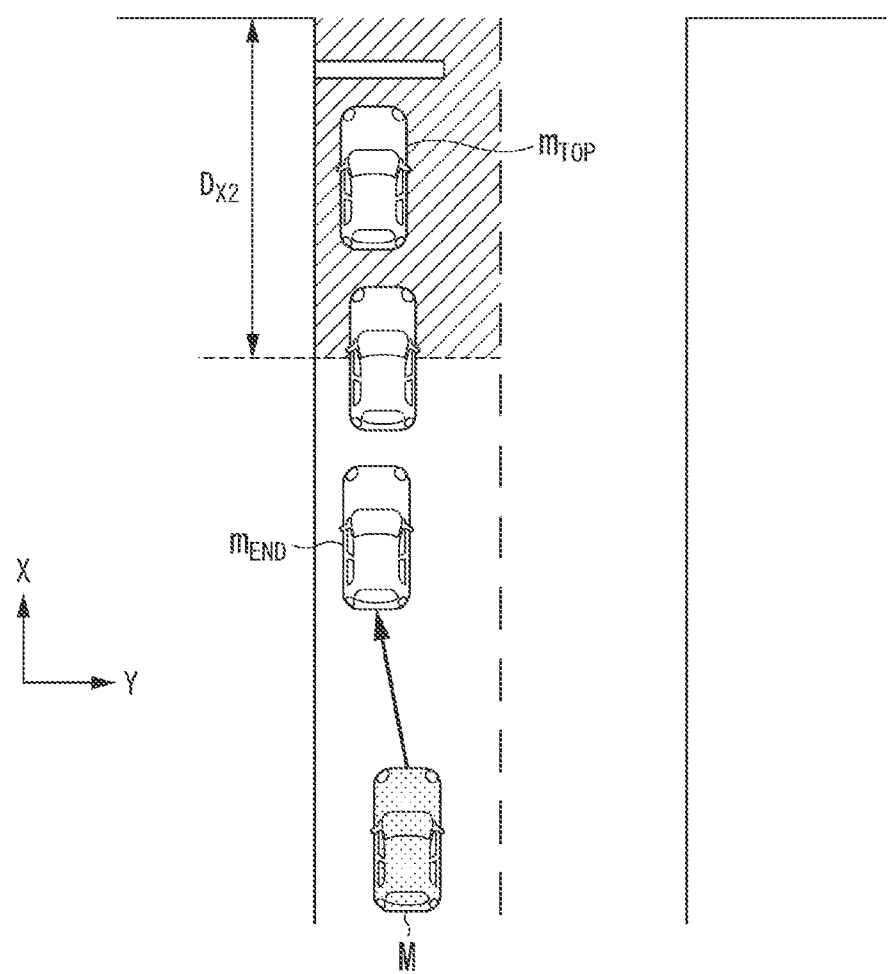

FIG. 11 is a diagram showing another example of a situation in which a congested vehicle queue is not overtaken. In the illustrated example, a congested vehicle queue including three vehicles are formed ahead of the host vehicle M and the first vehicle $m_{TOP}$ of the congested vehicle queue is not separated from an intersection by the predetermined distance $D_{X2}$ or more. In such a case, the determiner 146 determines that the predetermined conditions are not satisfied. In response to this, the event determiner 142 plans a following travel event, the target trajectory generator 144 generates a target trajectory in response to the following travel event and the second controller 160 causes the host vehicle M to follow the end vehicle $m_{END}$ of the congested vehicle queue by controlling at least the speed of the host vehicle M on the basis of the target trajectory.

Figure 12:
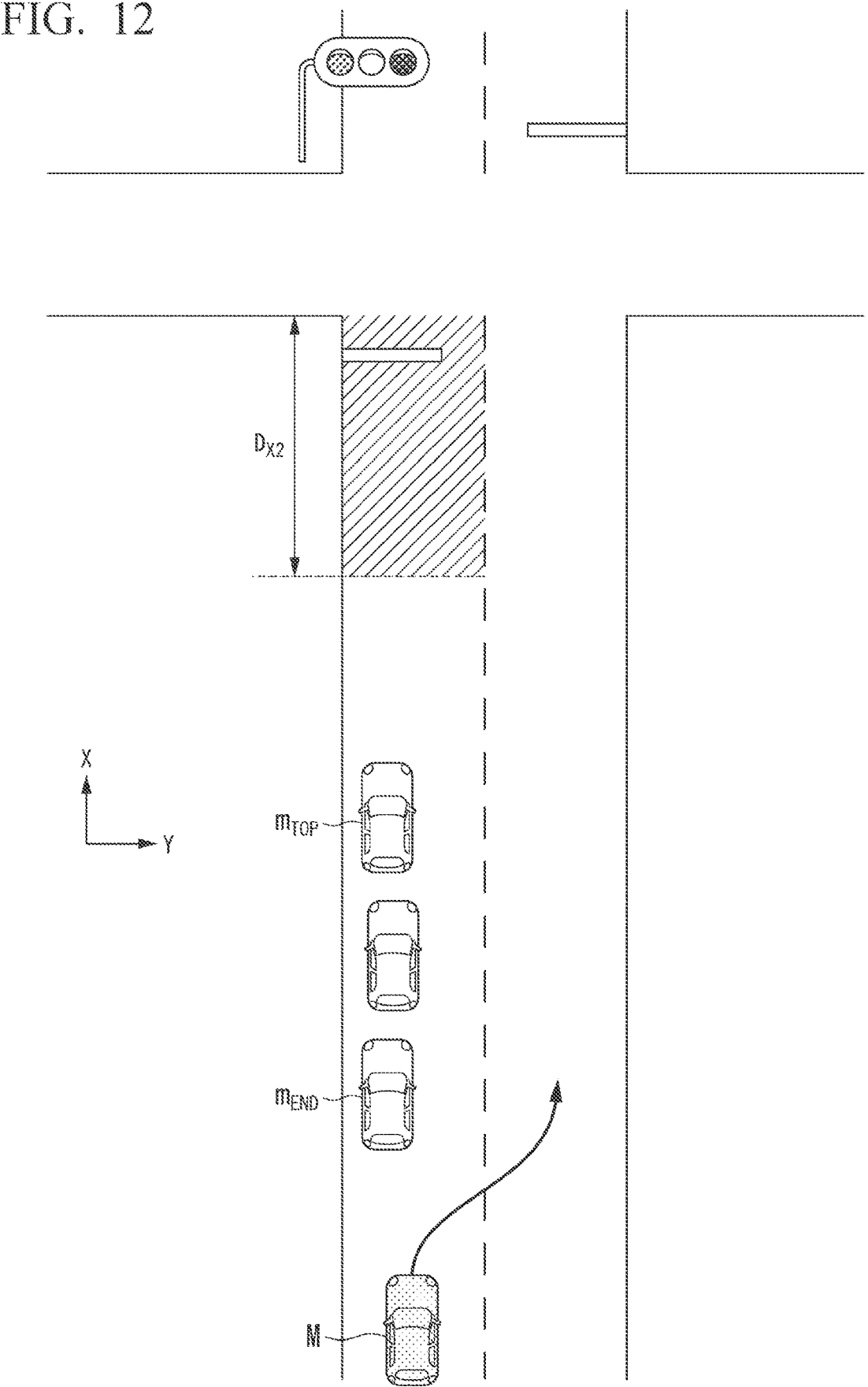
FIG. 12 is a diagram showing another example of a situation in which a congested vehicle queue is overtaken.

FIG. 12 is a diagram showing another example of a situation in which a congested vehicle queue is overtaken. In the illustrated example, a congested vehicle queue including three vehicles are formed ahead of the host vehicle M as in the example of FIG. 11 and the top vehicle $m_{TOP}$ of the congested vehicle queue is separated from an intersection by the predetermined distance $D_{X2}$ or more. In such a case, the determiner 146 determines that the predetermined conditions are satisfied. In response to this, the event determiner 142 plans an overtaking event, the target trajectory generator 144 generates a target trajectory in response to the overtaking event and the second controller 160 causes the host vehicle M to overtake the congested vehicle queue by controlling the speed and steering of the host vehicle M on the basis of the target trajectory.

According to the above-described second embodiment, it is possible to determine whether a congested vehicle queue ahead of the host vehicle M is a congested vehicle queue for entering a predetermined facility or a congested vehicle queue caused by traffic regulations (one of other factors) at an intersection with higher accuracy by determining whether the top vehicle $m_{TOP}$ of the congested vehicle queue is separated from the intersection by the predetermined distance $D_{X2}$ or more as a predetermined condition with respect to a condition ahead of a stopped vehicle. Consequently, it is possible to overtake a preceding vehicle more appropriately according to surrounding traffic conditions.

Third Embodiment

Hereinafter, a third embodiment will be described. The third embodiment differs from the above-described first and second embodiments in that the predetermined conditions with respect to a condition ahead of a stopped vehicle include one or both of separation of a predetermined facility and an intersection from each other by a predetermined distance $D_{X3}$ or more in the traveling direction of the vehicle and presence of the predetermined facility in front of the intersection when viewed from the host vehicle M. Hereinafter, description will focus on differences from the first and second embodiments and description of functions and the like in common with the first and second embodiments will be omitted.

For example, the determiner 146 in the third embodiment may determine whether a predetermined facility and an intersection are separated from each other by the predetermined distance $D_{X3}$ or more in the traveling direction of the vehicle and whether the predetermined facility is present in front of the intersection when viewed from the host vehicle M. Then, the determiner 146 determines that the predetermined conditions are satisfied (the congested vehicle queue is overtaken) when it is determined that the predetermined facility and the intersection are separated from each other by the predetermined distance $D_{X3}$ or more and/or it is determined that the predetermined facility is present in front of the intersection and determines that the predetermined conditions are not satisfied (the congested vehicle queue is not overtaken) in the case of other determination results.

Figure 13:
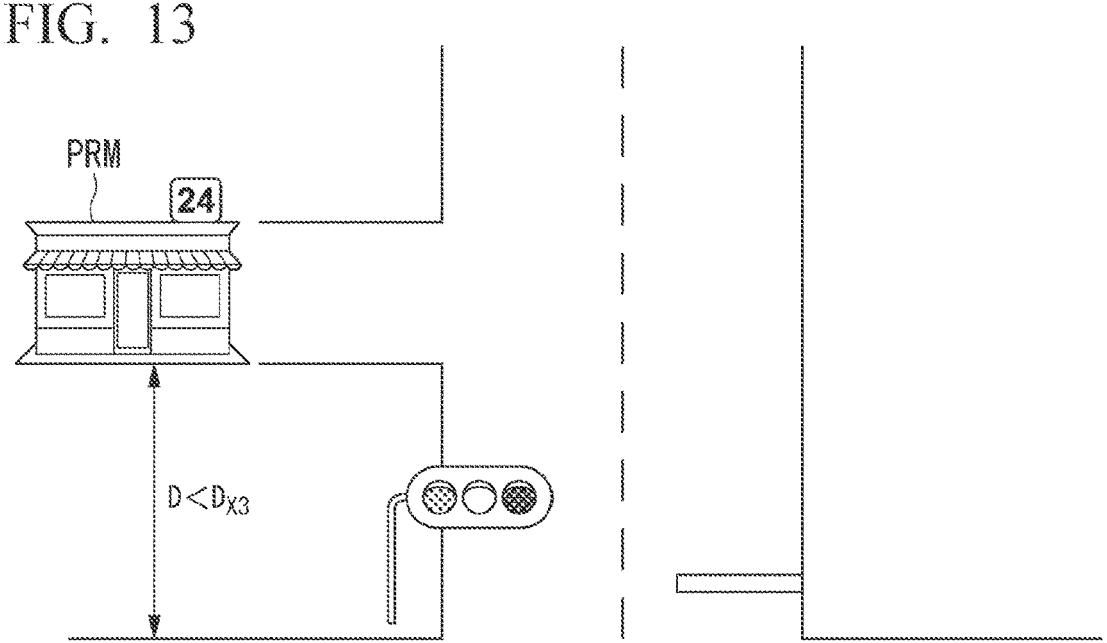
FIG. 13 is a diagram showing another example of a situation in which a congested vehicle queue is not overtaken.
Figure 13:
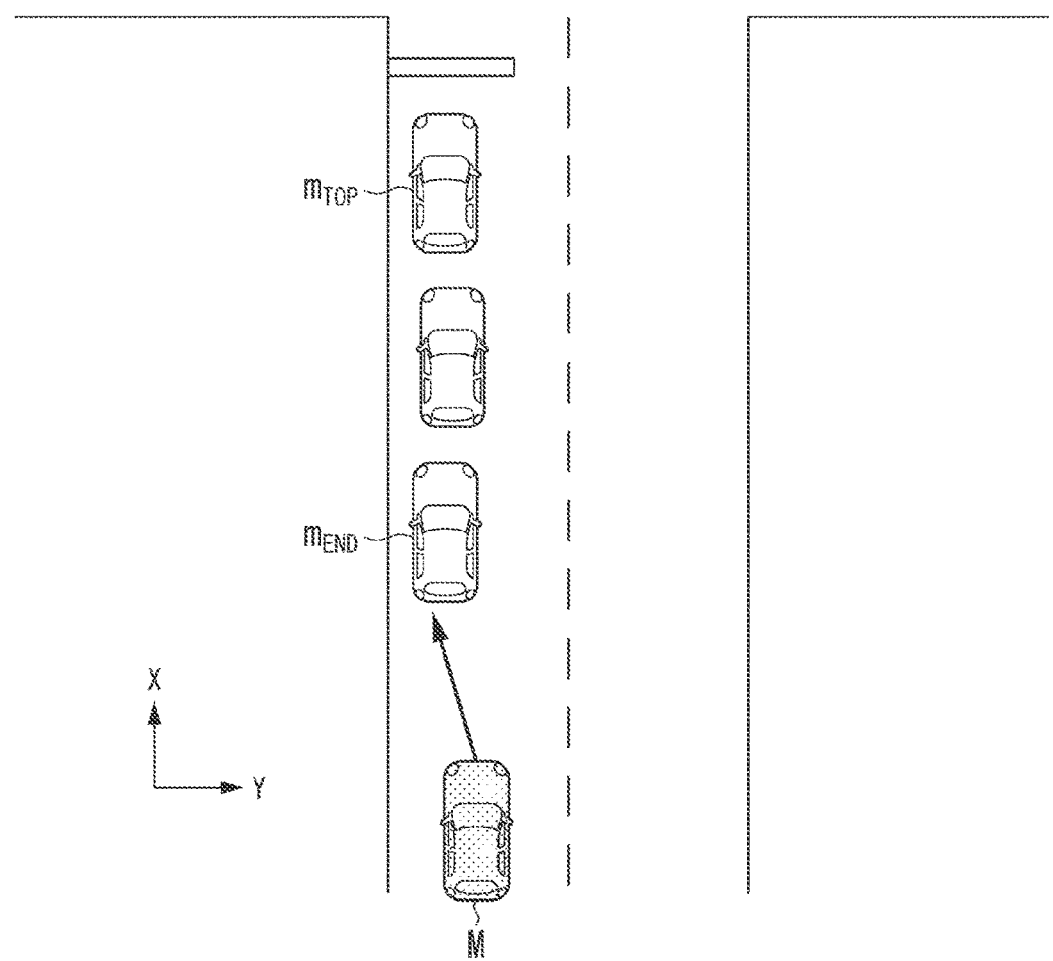

FIG. 13 is a diagram showing another example of a situation in which a congested vehicle queue is not overtaken. In the illustrated example, a predetermined facility PRM is present on the back side of an intersection when viewed from the host vehicle M and the distance D between the predetermined facility and the intersection in the traveling direction X of the vehicle is less than the predetermined distance $D_{X3}$ in the traveling direction X of the vehicle. In such a case, the determiner 146 determines that the predetermined conditions are not satisfied, for example. In response to this, the event determiner 142 plans a following travel event, the target trajectory generator 144 generates a target trajectory in response to the following travel event and the second controller 160 causes the host vehicle M to follow the end vehicle $m_{END}$ of the congested vehicle queue by controlling at least the speed of the host vehicle M on the basis of the target trajectory.

Figure 14:
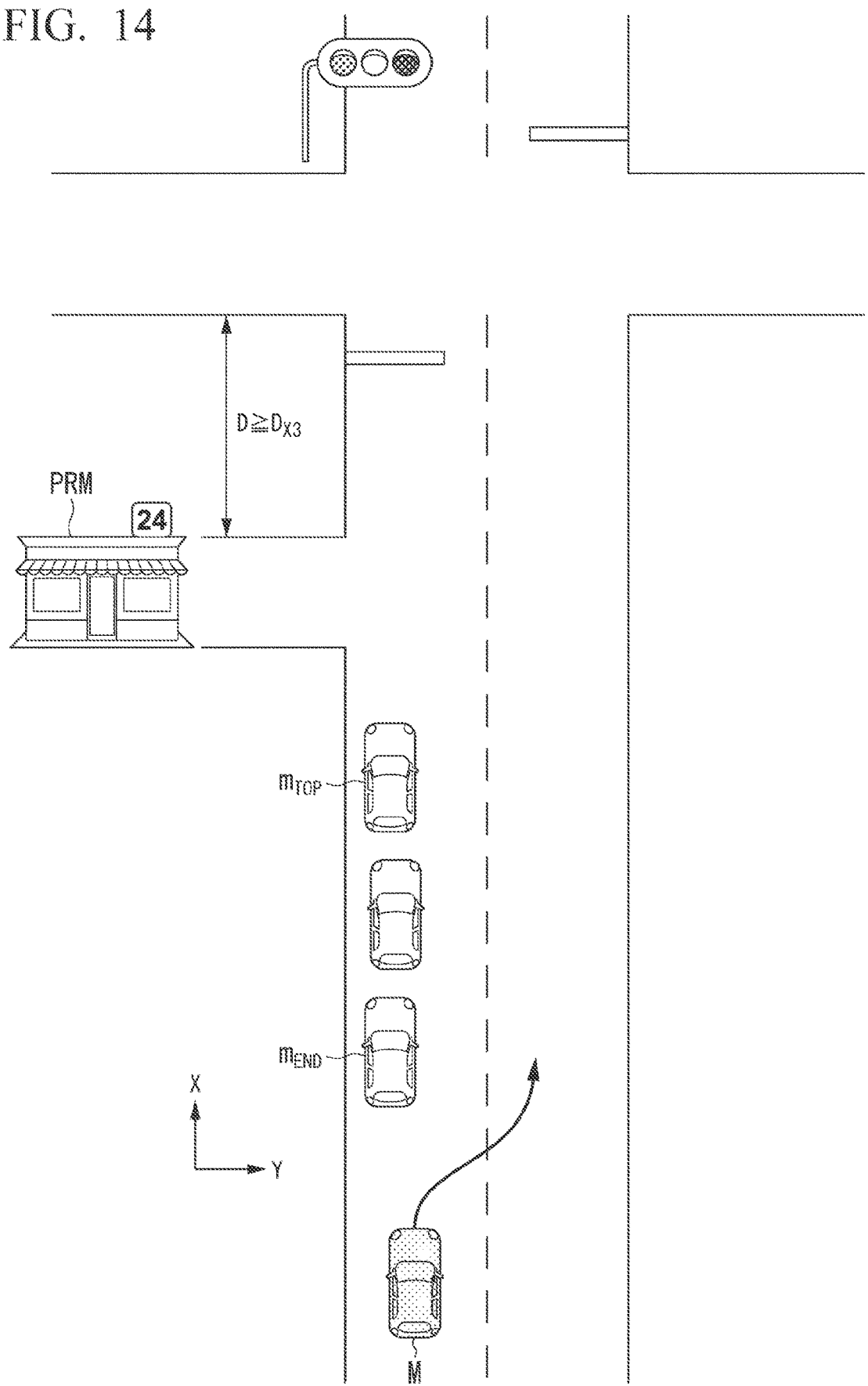
FIG. 14 is a diagram showing another example of a situation in which a congested vehicle queue is overtaken.

FIG. 14 is a diagram showing another example of a situation in which a congested vehicle queue is overtaken. In the illustrated example, the predetermined facility PRM is present in front of the intersection when viewed from the host vehicle M and the distance D between the predetermined facility and the intersection is the predetermined distance $D_{X3}$ or more in the traveling direction X of the vehicle. In such a case, the determiner 146 determines that the predetermined conditions are satisfied, for example. In response to this, the event determiner 142 plans an overtaking event, the target trajectory generator 144 generates a target trajectory in response to the overtaking event and the second controller 160 causes the host vehicle M to overtake the congested vehicle queue by controlling the speed and steering of the host vehicle M on the basis of the target trajectory. The determiner 146 may determine whether the first vehicle $m_{TOP}$ of the congested vehicle queue is separated from the intersection by the predetermined distance $D_{X2}$ or more in the traveling direction of the vehicle as in the second embodiment and determine that the predetermined conditions are satisfied when it is determined that the first vehicle $m_{TOP}$ is separated from the intersection by the predetermined distance $D_{X2}$ or more and at least one of presence of the predetermined facility PRM in front of the intersection when viewed from the host vehicle M and separation of the predetermined facility and the intersection from each other by the predetermined distance $D_{X3}$ or more is satisfied.

According to the above-described third embodiment, it is possible to determine whether a congested vehicle queue ahead of the host vehicle M is a congested vehicle queue for entering a predetermined facility or a congested vehicle queue caused by traffic regulations (one of other factors) at an intersection with higher accuracy by determining whether the predetermined facility is present in front of the intersection when viewed from the host vehicle M and whether the predetermined facility and the intersection are separated from each other by the predetermined distance $D_{X3}$ or more in the traveling direction X of the vehicle as the predetermined conditions with respect to a condition ahead of a stopped vehicle. Consequently, it is possible to overtake a preceding vehicle more appropriately according to surrounding traffic conditions.

Fourth Embodiment

Hereinafter, a fourth embodiment will be described. The fourth embodiment differs from the above-described first to third embodiments in that it is determined whether a congested vehicle queue ahead of the host vehicle M is a congested vehicle queue for entering a predetermined facility or a congested vehicle queue caused by other factors on the basis of information (hereinafter referred to as facility information) about the predetermined facility, such as opening of an event such as a sale. Hereinafter, description will focus on differences from the first to third embodiments and description of functions and the like in common with the first to third embodiments will be omitted.

Figure 15:
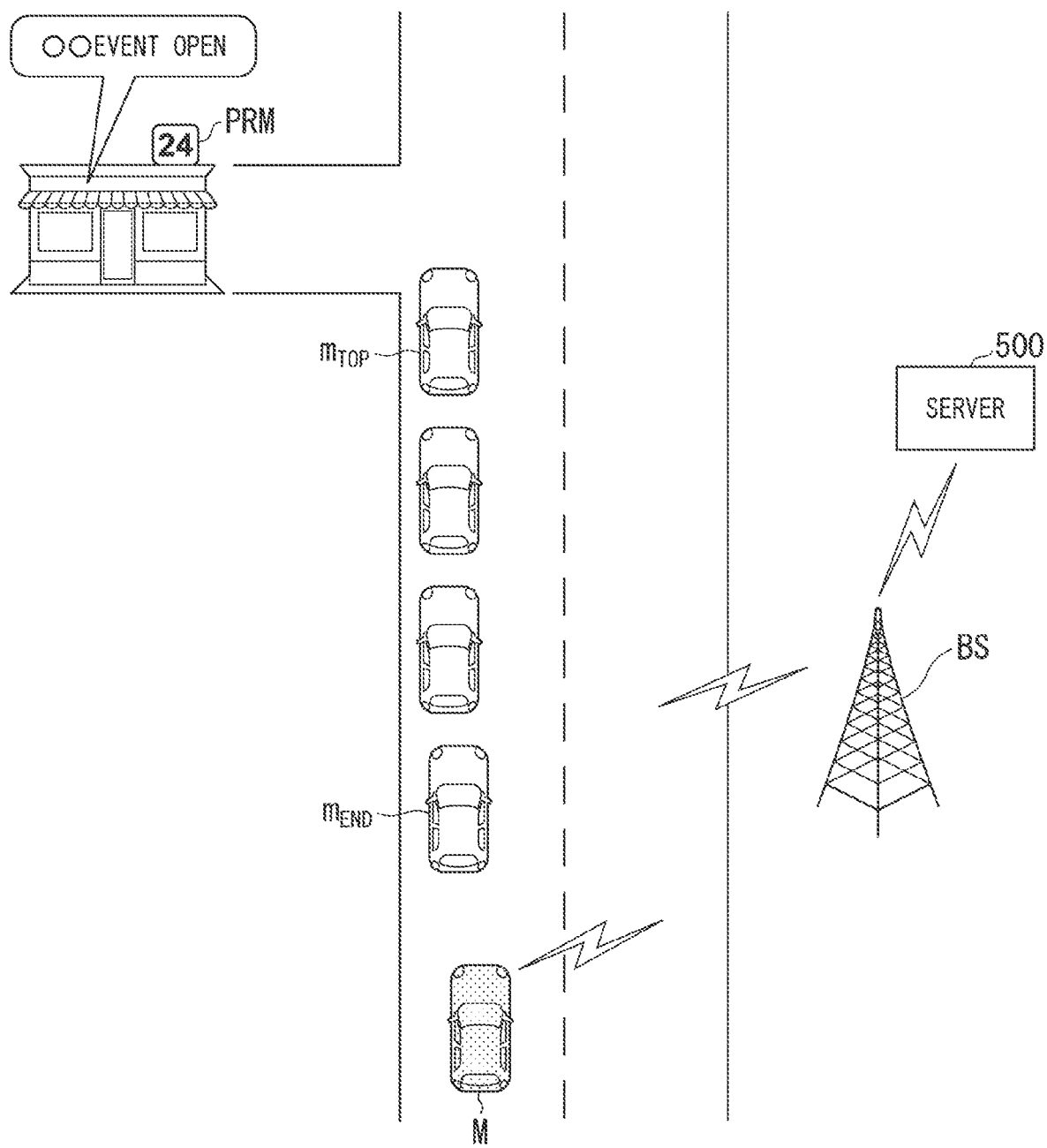
FIG. 15 is a diagram schematically showing a process performed by a vehicle system of a fourth embodiment.

FIG. 15 is a diagram schematically showing a process performed by the vehicle system 1 of the fourth embodiment. The communication device 20 in the fourth embodiment communicates with an external server 500 through a network including a wireless base station BS and the like to acquire facility information. For example, the server 500 may collect information on contents, date and time of an event or the like as facility information from a terminal device of a predetermined facility in which the event or the like is scheduled to be performed. The server 500 may collect the information on the contents, date and time of the event or the like as facility information by interpreting content such as comments and mini-blogs uploaded to a social networking service (SNS) (e.g., extracting words such as the name, date and time of the event according to morphological analysis).

When the communication device 20 acquires the facility information, the determiner 146 in the fourth embodiment determines whether the event is open in the predetermined facility with reference to the facility information when the predetermined facility is present ahead of the preceding vehicle and a congested vehicle queue is formed. In the illustrated example, the determiner 146 determines that the congested vehicle queue ahead of the host vehicle M is a congested vehicle queue for entering the predetermined facility since "00 event is open" in the predetermined facility PRM (INFO in the figure).

According to the above-described fourth embodiment, since it is determined whether the congested vehicle queue ahead of the host vehicle M is a congested vehicle queue for entering the predetermined facility or a congested vehicle queue caused by other factors on the basis of the facility information acquired through a network, it is possible to determine that the ahead congested vehicle queue is a congested vehicle queue for entering the predetermined facility when the event is open and thus a large number of users are expected to be gathered in the predetermined facility, for example. Consequently, it is possible to overtake a preceding vehicle more appropriately according to surrounding traffic conditions.

Fifth Embodiment

Hereinafter, a fifth embodiment will be described. The fifth embodiment differs from the above-described first to fourth embodiments in that a travel history of routes through which the host vehicle M has passed in the past and travel histories of routes through which other vehicles (i.e., automated driving vehicles) equipped with other systems corresponding to the vehicle system 1 have passed in the past are learnt and it is determined whether a congested vehicle queue ahead of the host vehicle M is a congested vehicle queue for entering a predetermined facility or a congested vehicle queue caused by other factors. Hereinafter, description will focus on differences from the first to fourth embodiments and description of functions and the like in common with the first to fourth embodiments will be omitted.

For example, the storage 180 in the fifth embodiment may store travel history information 182 representing the travel history of the host vehicle M and the travel histories of other vehicles. The travel history information 182 may be stored in the storage 180 in advance or downloaded from other servers and stored in the storage 180.

FIG. 16 is a diagram showing an example of the travel history information 182. For example, the travel history information 182 may be information in which presence or absence of a predetermined facility in a section in which the vehicle has traveled is associated with frequency of overtake in each time zone. It is considered that the host vehicle M has changed lanes to a neighboring lane in order to overtake the congested vehicle queue ahead thereof when a predetermined facility is present ahead of the host vehicle M, for example. In this case, the recognizer 130 recognizes that the first vehicle $m_{TOP}$ of the congested vehicle queue enters the predetermined facility since the predetermined facility is present head of the host vehicle M. In response to this result, the first controller 120 confirms that the overtaken congested vehicle queue is a congested vehicle queue for entering the predetermined facility and increments the overtake count of the relevant time zone of the section in which the predetermined facility is present in the travel history information 182. On the other hand, it is considered that the host vehicle M has changed lanes to a neighboring lane in order to overtake the congested vehicle queue ahead thereof when the predetermined facility is not present ahead of the host vehicle M. In this case, the recognizer 130 recognizes that the first vehicle $m_{TOP}$ of the congested vehicle queue does not enter the predetermined facility since the predetermined facility is not present head of the host vehicle M. In response to this result, the first controller 120 confirms that the overtaken congested vehicle queue is a congested vehicle queue caused by other factors and increments the overtake count of the relevant time zone of the section in which the predetermined facility is not present in the travel history information 182. Accordingly, overtake frequency is updated. The above-described overtake frequency update process may be performed in a system corresponding to the vehicle system 1 mounted in other vehicles. For example, the system mounted in other vehicles may update the travel history information 182 to the server by confirming whether the overtaken congested vehicle queue is a congested vehicle queue for entering the predetermined facility or a congested vehicle queue caused by other factors and then uploading the information to the server.

The determiner 146 in the fifth embodiment learns whether a section in which the host vehicle M is currently traveling is a section in which a congested vehicle queen for entering the predetermined facility is easily formed or a section in which a congested vehicle queue caused by other factors is easily formed on the basis of the travel history information 182 stored in the storage 180. For example, since the overtake frequency is high in a time zone from 10:00 to 13:00 and a time zone from 16:00 to 21:00 in a section A in which the predetermined facility is present, the determiner 146 learns that a congested vehicle queue for entering the predetermined facility is easily formed in those time zones of the section A. Since the overtake frequency is high in a time zone from 7:00 to 10:00 and a time zone from 16:00 to 19:00 in a section B in which the predetermined facility is not present, the determiner 146 learns that a congested vehicle queue caused by other factors is easily formed in those time zones of the section B.

In addition, the determiner 146 determines whether the predetermined conditions are satisfied on the basis of a result of learning in the current section and time zone when it is determined that the speed of the preceding vehicle is less than the predetermined speed, that is, when the preceding vehicle is a stopped vehicle. For example, in the case of a time zone or a section learnt to be a time zone or a section in which a congested vehicle queue for entering the predetermined facility is easily formed, the determiner 146 may determine that the predetermined conditions are satisfied and determine that the congested vehicle queue ahead of the host vehicle M is a congested vehicle queue for entering the predetermined facility. On the other hand, in the case of a time zone or a section learnt to be a time zone or a section in which a congested vehicle queue caused by other factors is easily formed, the determiner 146 may determine that the predetermined conditions are not satisfied and determine that the congested vehicle queue ahead of the host vehicle M is a congested vehicle queue caused by other factors.

According to the above-described fifth embodiment, it is possible to appropriately overtake a preceding vehicle without depending on surrounding traffic conditions because it is learnt whether a congested vehicle queue ahead of the host vehicle M is a congested vehicle queue for entering a predetermined facility or a congested vehicle queue caused by other factors on the basis of the travel history information 182 including past overtake histories of the host vehicle M or other vehicles when it is determined that the speed of the preceding vehicle is less than a predetermined speed.

[Hardware Configuration]

Figure 17:
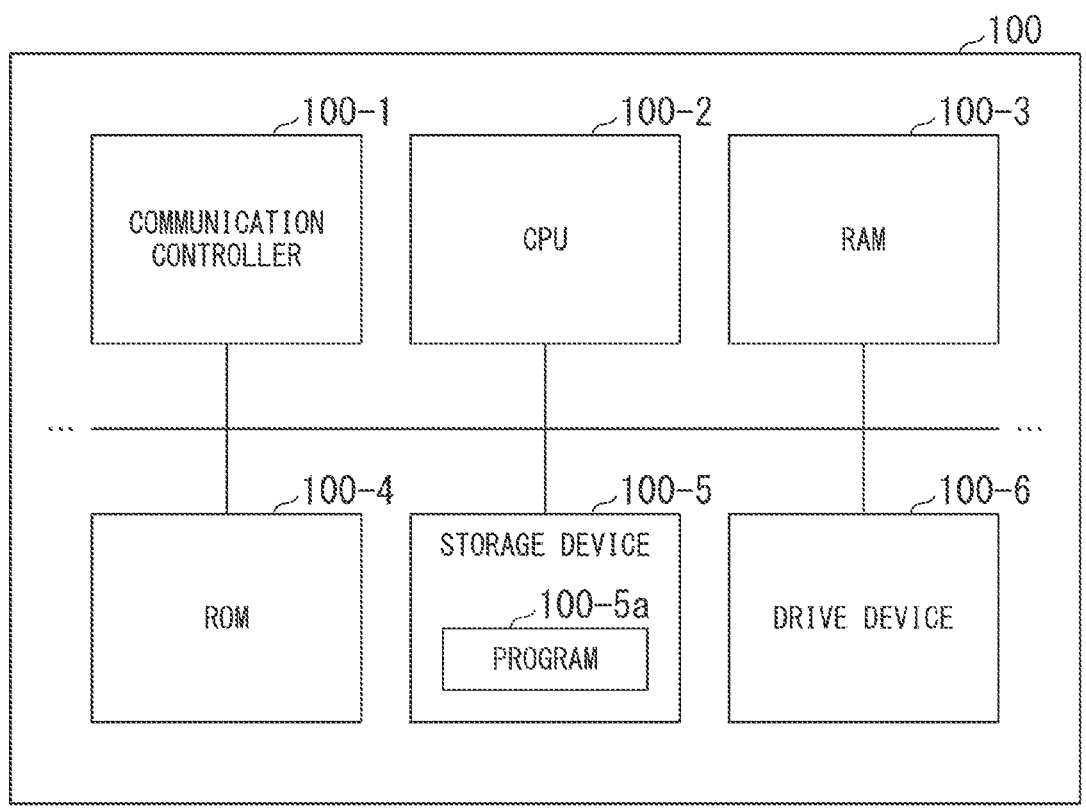
FIG. 17 is a diagram showing an example of a hardware configuration of the automated driving control device of the embodiment.

FIG. 17 is a diagram showing an example of a hardware configuration of the automated driving control device 100 of embodiments. As illustrated, the automated driving control device 100 has a configuration in which a communication controller 100-1, a CPU 100-2, a RAM 100-3 used as a working memory, a ROM 100-4 storing a boot program and the like, a storage device 100-5 such as a flash memory or an HDD, a drive device 100-6 and the like are connected through an internal bus or a dedicated communication line. The communication controller 100-1 performs communication with components other than the automated driving control device 100. A program 100-5a executed by the CPU 100-2 is stored in the storage device 100-5. This program is developed in the RAM 100-3 according to a direct memory access (DMA) controller (not shown) or the like and executed by the CPU 100-2. Accordingly, a part or all of the first controller 120 and the second controller 160 are realized.

The above-described embodiments can be represented as follows.

A vehicle control device including:
a storage which stores a program; and
a processor,
wherein the processor is configured to, by executing the program:
recognize objects around a host vehicle;
determine whether the speed of a preceding vehicle present ahead of the host vehicle in a host lane in which the host vehicle is present among one or more recognized objects is less than a predetermined speed;
determine whether predetermined conditions with respect to a condition ahead of the preceding vehicle are satisfied when it is determined that the speed of the preceding vehicle is less than the predetermined speed; and
cause the host vehicle to overtake at least the preceding vehicle by controlling the speed and steering of the host vehicle when it is determined that the predetermined conditions are satisfied.

While forms for embodying the present invention have been described using embodiments, the present invention is not limited to these embodiments and various modifications and substitutions can be made without departing from the spirit or scope of the present invention.

What is claimed is:

1. A vehicle control device comprising:
a processor that executes instructions to:
recognize objects around a host vehicle;
determine whether a speed of at least one preceding vehicle present ahead of the host vehicle in a host lane in which the host vehicle is present among one or more objects that have been recognized is less than a predetermined speed and determine whether predetermined conditions with respect to conditions ahead of the at least one preceding vehicle are satisfied when it is determined that the speed of the at least one preceding vehicle is less than the predetermined speed; and
cause the host vehicle to overtake the at least one preceding vehicle by controlling a speed and steering of the host vehicle when the predetermined conditions are satisfied,
wherein the predetermined conditions include a condition that a predetermined facility is present ahead when viewed from the host vehicle,
wherein the processor executes further instructions to control the speed and steering of the host vehicle to cause the host vehicle to move to a position biased to a side at which the predetermined facility is present from the center of the host lane in vehicle with direction when the speed of the at least one preceding vehicle is less than the predetermined speed, and,
wherein the processor executes further instructions to determine whether the predetermined conditions are satisfied when the host vehicle is at the position biased from the center of the host lane.

2. The vehicle control device of claim 1,
wherein the predetermined conditions include a condition that one or more other vehicles are not present further ahead of the at least one preceding vehicle with a speed less than the predetermined speed.

3. The vehicle control device of claim 1,
wherein the predetermined conditions include a condition that the at least one preceding vehicle includes a vehicle operating a turn indicator on the side at which the predetermined facility is present.

4. The vehicle control device of claim of claim 1,
wherein the predetermined conditions include a condition that a predetermined facility is present ahead when viewed from the host vehicle, a condition that a dedicated lane for entering the predetermined facility from the host lane is present, and a condition that the speed of the at least one preceding vehicle present in the dedicated lane is less than a predetermined speed.

5. The vehicle control device of claim 1,
wherein the predetermined conditions include a condition that the position of a a vehicle furthest from the host vehicle among the at least one preceding vehicle is nearer to the host vehicle than the position of the predetermined facility in the traveling direction of the vehicle.

6. The vehicle control device of claim 1,
wherein the predetermined conditions include a condition that an intersection present ahead of the at least one preceding vehicle when viewed from the host vehicle and the first vehicle of the vehicle group are separated from each other by a predetermined distance or more in the traveling direction of the vehicle.

7. The vehicle control device of claim 1,
wherein the predetermined conditions include a condition that an intersection present ahead of the at least one preceding vehicle when viewed from the host vehicle and the predetermined facility are separated from each other by a predetermined distance or more in the traveling direction of the vehicle.

8. The vehicle control device of claim 1,
wherein the predetermined conditions include a condition that a difference between a distance between the position of the at least one preceding vehicle and the position of the predetermined facility on a map including a route to a destination of the host vehicle and the length of the vehicle group is within a predetermined range.

9. The vehicle control device of claim 1,
wherein the predetermined conditions include a condition that the vehicle group is present at a position biased from the center of the host lane to the side of a road side strip.

10. The vehicle control device of claim 1, wherein the processor further executes instructions to: acquire facility information about the predetermined facility, and
   determine whether the predetermined conditions are satisfied based on the facility information.

11. The vehicle control device of claim 1,
   wherein the processor further executes instructions to: determine whether the predetermined conditions are satisfied based on a history of overtaking performed by vehicles that have traveled in the host lane in the past when it is determined that the speed of the at least one preceding vehicle is less than the predetermined speed.

12. A vehicle control device comprising:
   a processor that executes instructions to:
   recognize objects around a host vehicle;
   determine whether a speed of at least one preceding vehicle present ahead of the host vehicle in a host lane in which the host vehicle is present among one or more objects is less than a predetermined speed and determine whether predetermined conditions with respect to conditions ahead of the at least one preceding vehicle are satisfied when it is determined that the speed of the at least one preceding vehicle is less than the predetermined speed; and
   cause the host vehicle to overtake the at least one preceding vehicle by controlling the speed and steering of the host vehicle when the predetermined conditions are satisfied,
   wherein the predetermined conditions include a condition that a predetermined facility is present ahead when viewed from the host vehicle, and a condition that an inclination of the at least one preceding vehicle with respect to a marking that marks the host lane is equal to or greater than a threshold value.

13. The vehicle control device of claim 12,
   wherein, when the at least one preceding vehicle are a plurality of vehicles, the processor executes further instructions to: control the speed and steering of the host vehicle to cause the host vehicle to move to a position biased to a side at which the predetermined facility is present from the center of the host lane in the vehicle width direction, and determine whether an inclination of a vehicle furthest from the host vehicle among the plurality of vehicles is equal to or greater than the threshold value or not when the host vehicle is at the position biased from the center of the host lane.

14. A vehicle control device comprising:
   a processor that executes instructions to:
   recognize objects around a host vehicle;
   determine whether a speed of at least one preceding vehicle present ahead of the host vehicle in a host lane in which the host vehicle is present among one or more objects is less than a predetermined speed and determine whether predetermined conditions with respect to conditions ahead of the at least one preceding vehicle are satisfied when it is determined that the speed of the at least one preceding vehicle is less than the predetermined speed; and
   cause the host vehicle to overtake the at least one preceding vehicle by controlling the speed and steering of the host vehicle when the predetermined conditions are satisfied,
   wherein the predetermined conditions include a condition that a predetermined facility is present ahead when viewed from the host vehicle, and a condition that an intersection present ahead of the preceding vehicle when viewed from the host vehicle is farther away from the host vehicle than the position of the predetermined facility in the traveling direction of the vehicle.

* * * * *